United States Patent
Yang et al.

(10) Patent No.: US 10,027,728 B2
(45) Date of Patent: Jul. 17, 2018

(54) SYSTEMS AND METHODS OF STREAMING DATA

(71) Applicant: eBay Inc., San Jose, CA (US)

(72) Inventors: Connie W. Yang, Saratoga, CA (US); Viswa Vutharkar, Roseville, CA (US); Ankur Bansal, Fremont, CA (US); Christopher J. Kasten, Rancho Cordova, CA (US); Michael Chiocca, Mountain View, CA (US); Dharani Ramanathan, Santa Clara, CA (US); Subash Ramanathan, Marina Del Rey, CA (US); Padma Nayak, San Jose, CA (US); Rajeshwari Muthupandian, San Jose, CA (US)

(73) Assignee: eBay Inc., San Jose, CA (US)

( * ) Notice: Subject to any disclaimer, the term of this patent is extended or adjusted under 35 U.S.C. 154(b) by 185 days.

(21) Appl. No.: 14/920,562

(22) Filed: Oct. 22, 2015

(65) Prior Publication Data
US 2016/0261727 A1 Sep. 8, 2016

Related U.S. Application Data

(60) Provisional application No. 62/129,240, filed on Mar. 6, 2015.

(51) Int. Cl.
*H04L 29/06* (2006.01)
*H04L 29/14* (2006.01)

(52) U.S. Cl.
CPC .......... *H04L 65/4069* (2013.01); *H04L 69/40* (2013.01)

(58) Field of Classification Search
CPC .................................... H04L 65/4069
USPC ........................................ 709/219
See application file for complete search history.

(56) References Cited

U.S. PATENT DOCUMENTS

| | | | |
|---|---|---|---|
| 7,031,974 B1 * | 4/2006 | Subramaniam ... | G06F 17/30575 |
| 2008/0027987 A1 * | 1/2008 | Arora ............... | G06F 17/30212 |
| 2012/0185432 A1 * | 7/2012 | Ding ................. | G06F 17/30578 |
| | | | 707/620 |

* cited by examiner

*Primary Examiner* — David Lazaro
*Assistant Examiner* — Zia Khurshid
(74) *Attorney, Agent, or Firm* — Schwegman Lundberg & Woessner Woessner, P.A.

(57) ABSTRACT

Systems and methods of stream technologies are disclosed. In some example embodiments, a method and system for a database stream switchover from one data center to another with notification at each component is provided.

20 Claims, 22 Drawing Sheets

SYSTEMS AND METHODS OF STREAMING DATA

CROSS-REFERENCE TO RELATED APPLICATIONS

This application claims the benefit of priority, under 35 U.S.C. Section 119(e), to U.S. Provisional Application No. 62/129,240, filed on Mar. 6, 2015, entitled, "STREAMING-AS-A-SERVICE", which is hereby incorporated by reference in its entirety as if set forth herein.

TECHNICAL FIELD

The present application relates generally to the technical field of data processing, and, in various embodiments, to systems and methods of stream processing technologies.

BRIEF DESCRIPTION OF THE DRAWINGS

Some embodiments of the present disclosure are illustrated by way of example and not limitation in the figures of the accompanying drawings, in which like reference numbers indicate similar elements, and in which.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

The methods or embodiments disclosed herein may be implemented as a computer system having one or more modules (e.g., hardware modules or software modules). Such modules may be executed by one or more processors of the computer system. The methods or embodiments disclosed herein may be embodied as instructions stored on a machine-readable medium that, when executed by one or more processors, cause the one or more processors to perform the instructions.

Figure 1:
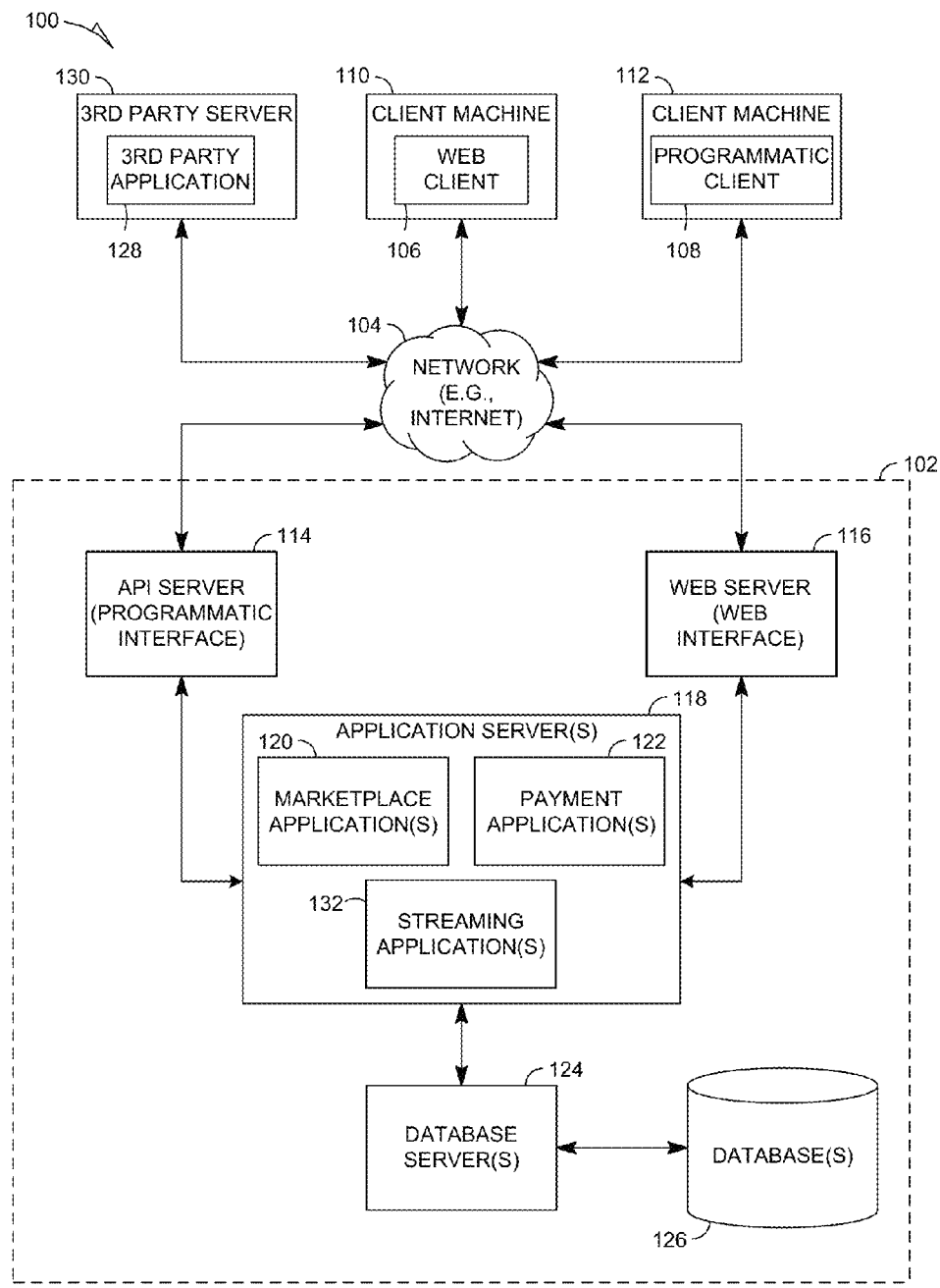
FIG. 1 is a block diagram depicting a network architecture of a system having a client-server architecture configured for exchanging data over a network, in accordance with some embodiments.

FIG. 1 is a network diagram depicting a client-server system 100, within which one example embodiment may be deployed. A networked system 102, in the example forms of a network-based marketplace or publication system, provides server-side functionality, via a network 104 (e.g., the Internet or a Wide Area Network (WAN)) to one or more clients. FIG. 1 illustrates, for example, a web client 106 (e.g., a browser, such as the Internet Explorer browser developed by Microsoft Corporation of Redmond, Wash. State) and a programmatic client 108 executing on respective client machines 110 and 112.

An API server 114 and a web server 116 are coupled to, and provide programmatic and web interfaces respectively to, one or more application servers 118. The application servers 118 host one or more marketplace applications 120 and payment applications 122. The application servers 118 are, in turn, shown to be coupled to one or more database servers 124 that facilitate access to one or more databases 126.

The marketplace applications 120 may provide a number of marketplace functions and services to users who access the networked system 102. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 120. While the marketplace and payment applications 120 and 122 are shown in FIG. 1 to both form part of the networked system 102, it will be appreciated that, in alternative embodiments, the payment applications 122 may form part of a payment service that is separate and distinct from the networked system 102.

Further, while the system 100 shown in FIG. 1 employs a client-server architecture, the embodiments are, of course not limited to such an architecture, and could equally well find application in a distributed, or peer-to-peer, architecture system, for example. The various marketplace and payment applications 120 and 122 could also be implemented as standalone software programs, which do not necessarily have networking capabilities.

The web client 106 accesses the various marketplace and payment applications 120 and 122 via the web interface supported by the web server 116. Similarly, the programmatic client 108 accesses the various services and functions provided by the marketplace and payment applications 120 and 122 via the programmatic interface provided by the API server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace, or payment functions that are supported by the relevant applications of the networked system 102.

In some example embodiments, the application server(s) 118 host one or more streaming applications 132. The streaming application(s) 132 are configured to implement and provide the features discussed below and shown in the figures. In some example embodiments, the streaming application(s) 132 are implemented as executable instructions, stored on a non-transitory computer-readable medium, that when executed, cause at least one processor to perform one or more of the operations discussed herein. In some example embodiments, a system comprises at least one processor and the non-transitory computer-readable medium on which the executable instructions are stored.

Big data is changing the expectations and demand on data infrastructure, applications and processes across industries. In today's world, applications that depend solely on batch-oriented data processing suffer from well-known limitations, mainly around the inability to perform real-time computations or in-stream query processing of constant incoming streams of rapidly changing data. Most batching systems expend hours or even days to just collect and stage the required data in massive storage, and then even more time to process the collected data to obtain business intelligence. As such, the intelligence obtained often becomes stale before it's put to use.

A stream refers to constant incoming flow of messages of a similar type or category. For example, a stream can comprise all the clicks on a website (e.g., a click stream), behavioral and activity tracking data, all the updates to a database, all the logs produced by a service, or any other type of event data. The term "streaming" can refer to applying business logic to streams of incoming data in real-time and obtaining business intelligence instantly. Utilizing streaming technologies can accelerate core business processes and remove data latencies caused by extract, transform and load (ETL) approaches or other approaches, through real-time instream processing of incoming data.

Figure 2:
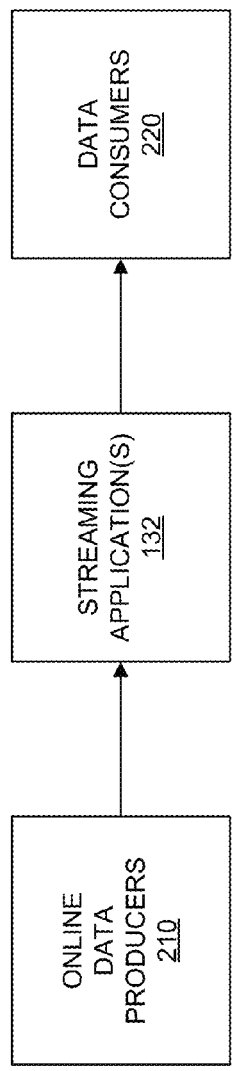
FIG. 2 is a block diagram depicting streaming applications being used to stream data between online data producers and data consumers, in accordance with some embodiments.

FIG. 2 is a block diagram depicting one or more streaming applications 132 being used to stream data between online data producers 210 and data consumers 220, in accordance with some embodiments. Examples of data consumers 220 can include, but are not limited to, machine learning applications, analytics applications, and software frameworks for distributed storage and distributed processing of large data sets on computer clusters.

Stream processing systems coupled with efficient approaches to message queuing allow entities to overcome these limitations and provide the ability to receive, store and process tons of data from innumerable and varied sources as the data gets generated. Streaming applications can apply processing logic on live data streams to extract business insights in real-time, and make it instantaneously available to applications that need to consume this data. An efficient design of a stream processing application also provides a data continuum with access to its data anywhere along the continuum. The cost of ownership of stream processing systems is usually lower than other options like large ETL or map-reduce systems, as the key insights are obtained and leveraged in real-time and the sourced data is usually sent to offline systems for durable storage and offline analytics. Furthermore, the expected window for a stream processor to process and output its results is typically much lower than batch processing, often in the sub-second range, even as it handles several thousands of events/messages per second.

The world of big data has been rapidly evolving in the recent years. Data streaming gained a great deal of momentum as the need for obtaining business insights thru real-time processing of big data processing exploded. The industry has witnessed evolution and maturing of many open source efforts (e.g., Twitter Storm, LinkedIn Samza, Apache Spark, Yahoo 54, etc.) and proprietary systems (e.g., Amazon Kinesis, SQLstream, etc.) to tackle the requirements and complexities around event stream processing. eBay has developed a home-grown technology—JetStream—for building and deploying stream processing applications on eBay C3 cloud as well. Today, JetStream powers many mission critical event stream processing applications across the company.

Figure 3:
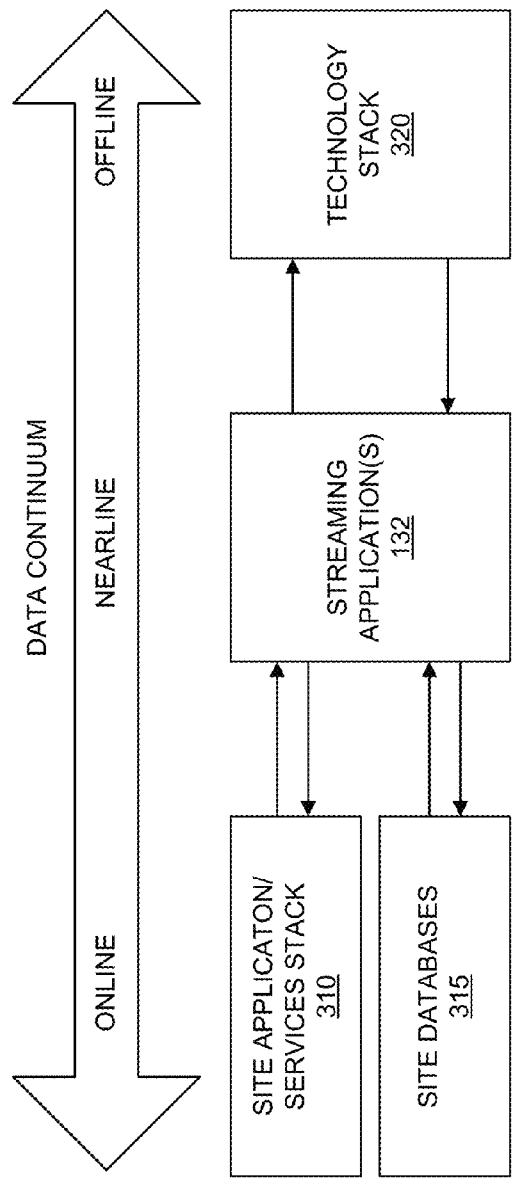
FIG. 3 is a block diagram depicting streaming applications being implemented within a website architecture, in accordance with some embodiments.

FIG. 3 is a block diagram depicting one or more streaming application(s) 132 being implemented within a website architecture, in accordance with some embodiments. As shown in FIG. 3, potential data sources and use cases can leverage real-time stream processing technologies. Streaming creates a data continuum between online and offline data sources with access to data anywhere along the continuum at desired granularity and freshness levels. The online data sources can include, but are not limited to, an application and services stack 310 for the website and one or more databases 315 for the website. The offline data sources can include, but are not limited to, a technology stack 320 of the website. Employing right streaming technologies makes it easy to tap into streams and access data at desired quality and consistency.

In a nutshell, the following are some of the general benefits that application teams can reap by adopting streaming technologies for fitting use cases:

Facilitates Real Time Analytics-Streaming offers the ability to process data instantaneously as site events occur, and thus helps drive real-time business decisions and fetches increased return on investment (ROI).

Reduced Licensing and Maintenance Costs—With a reliance entirely on open-source technologies, the licensing costs are effectively nil, and in general the operational overhead costs are substantially lower.

Reduced Infrastructure Costs—Stream processor grids generally require less compute power than its conventional rival technologies, but this will depend on the use case.

High availability and reliability—The clustering, load-balancing, and multi-region replication features enable fast failovers and recovery, thus allowing an entity to meet a promised Availability to Business (ATB) and superior reliability norms.

Low latency—Offers ability to handle very high velocity of large data streams at significantly low latencies (sub-seconds).

Durability—Uses modem messaging technologies (e.g., Kafka) to guarantee that messages are never lost and they are processed in the order received.

Data Quality—Offers guaranteed message delivery, data consistency, data availability, and guaranteed processing of messages at least once.

Easy Extensibility—Allows painless extensibility and interoperability of streaming applications by adding new event producers and consumers.

Scalability—Supported stream processing technologies (e.g., Storm, Kafka) provide horizontal scalability and efficient real-time distributed stream processing out of the box.

Leverages the C3 Ecosystem—Tightly integrates with the rest of the C3 ecosystem and offers advanced monitoring, alerting and management (scaling, creating, deleting of streams) capabilities on the cloud.

The following are example embodiments of streaming applications 132 within the scope of the present disclosure. The example embodiments also comprise systems and architectures configured to implement the streaming applications 132.

Metrics Aggregation, Reporting and Alerting

In some example embodiments, the present disclosure provides a method and system to provide checkpoint monitoring in real-time to near-time streaming from any data source to any destination with metrics aggregation, reporting and alerting. In a streaming pipeline (e.g., ActiveMQ→Storm→Kafka→Hadoop Distributed File System (HDFS) Writer), a method can be employed to aggregate and report metrics at each check point in the pipeline as the data flows from the source to its destination. This method enables monitoring and detection of the health/performance of this pipeline, alerting based on a pre-defined threshold/SLAs, and reacting to the anomalies based on the alerts.

Streaming application(s) 132 can provide a check point monitoring mechanism via a metrics framework. By including a metrics jar on the classpath of broker (e.g., Kafka) and supervisor (e.g., Storm) processes where the supervisor spouts/bolts are, a primary set of metrics is captured and reported to a software tool (e.g., a metrics dashboard, such as Graphite). In some example embodiments, the metrics set is defined through a white-list regular expression in a configuration file. Filtering capability can be used to only report a specific set of the available metrics that the metrics registry and the metric consumer interfaces provide.

Figure 4:
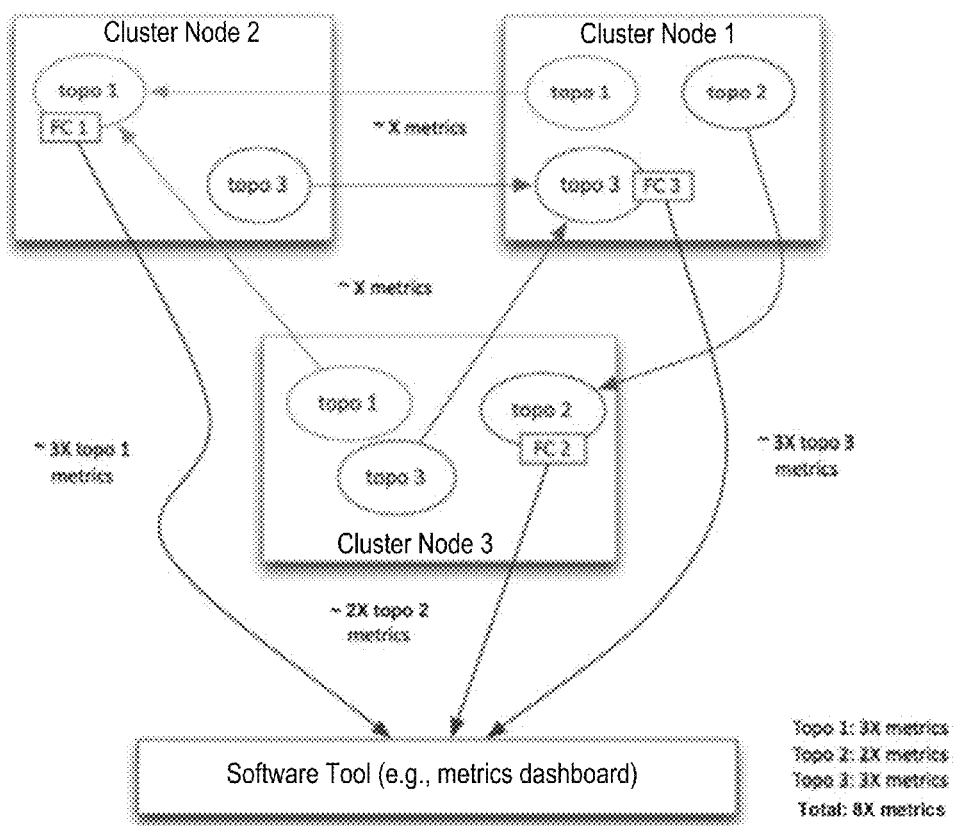
FIG. 4 is an illustration depicting how metrics are collected, in accordance with some embodiments.

FIG. 4 is an illustration depicting how metrics are collected in a cluster (e.g., a Storm cluster), in accordance with some embodiments. In some example, embodiments, when a topology spans multiple nodes in a cluster, one of those nodes is responsible for collecting the metrics of the entire topology from its peers. The collected metrics are then aggregated and reported to a software tool (e.g., a metrics dashboard, such as Graphite). Because each topology emits the same set of metrics at each interval, the total number of emitted metrics for a given cluster depends on the number of running topologies and the number of worker instances per topology.

In the example shown in FIG. 4, both a first topology (topo 1) and a third topology (topo 3) have three worker instances running, while a second topology (topo 2) has only two instances. Hence, the total number of emitted metrics from this cluster is 3X+2X+3X=8x metrics/minute.

A streaming pipeline can function as a messaging system for an upstream processor. The present disclosure provides a way to instigate a plug-in to determine and track the metrics at every point in the pipeline. Each point in time can be captured and then correlated at the end of the pipeline, providing end-to-end monitoring from the source of the stream, and generating metrics based on the output of the pipeline. The metrics are stored in a time-series database, where they can be correlated.

The streaming application(s) 132 can implement the checkpoint monitoring features at every checkpoint in the pipeline. For example, as a message of data flows into a Storm cluster, the Storm cluster comprises different processors to take the message from the queue. The Storm cluster generates metrics based on its functioning and performance with respect to the message. The message then flows to the next cluster, such as a Kafka cluster, where metrics are similarly generated. The metrics can be transmitted along the pipeline all the way to the end of the pipeline, where they can be aggregated and correlated, as previously discussed.

Installing Checkpoint Monitoring System During Provisioning

In some example embodiments, the present disclosure provides a method and system to install a checkpoint monitoring system during the provisioning of clusters (e.g., Zookeeper, Storm, and Kafka clusters) with a self-service, cloud-enabled streaming platform that enables real-time to near-time data access and processing. This streaming platform provides a mechanism for data movement, from any source to any destination, with open source technologies, such as Apache Kafka, Storm, and Zookeeper. The streaming platform can provide streaming services for Open Stack/C3 (or other open-source cloud computing platforms), provide an Infrastructure-as-a-Service (IaaS) and Platform-as-a-Service (PaaS) life cycle management API (REST and CLI), be integrated with Horizon, Keystone for authentication and monitoring, be built on top of a pluggable framework, and provide virtual machine (VM) and process-level monitoring via a metrics framework (e.g., the metrics framework discussed above in the section titled "METRICS AGGREGATION, REPORTING AND ALERTING").

In some example embodiments, as the streaming platform provisions and sets up the guest VMs for the clusters, the streaming platform also equips each streaming component with the metrics framework, thus automatically installing a metrics collection mechanism in each of the nodes at provisioning time.

Pluggable Metrics Provider and Reporter Framework

Figure 5:
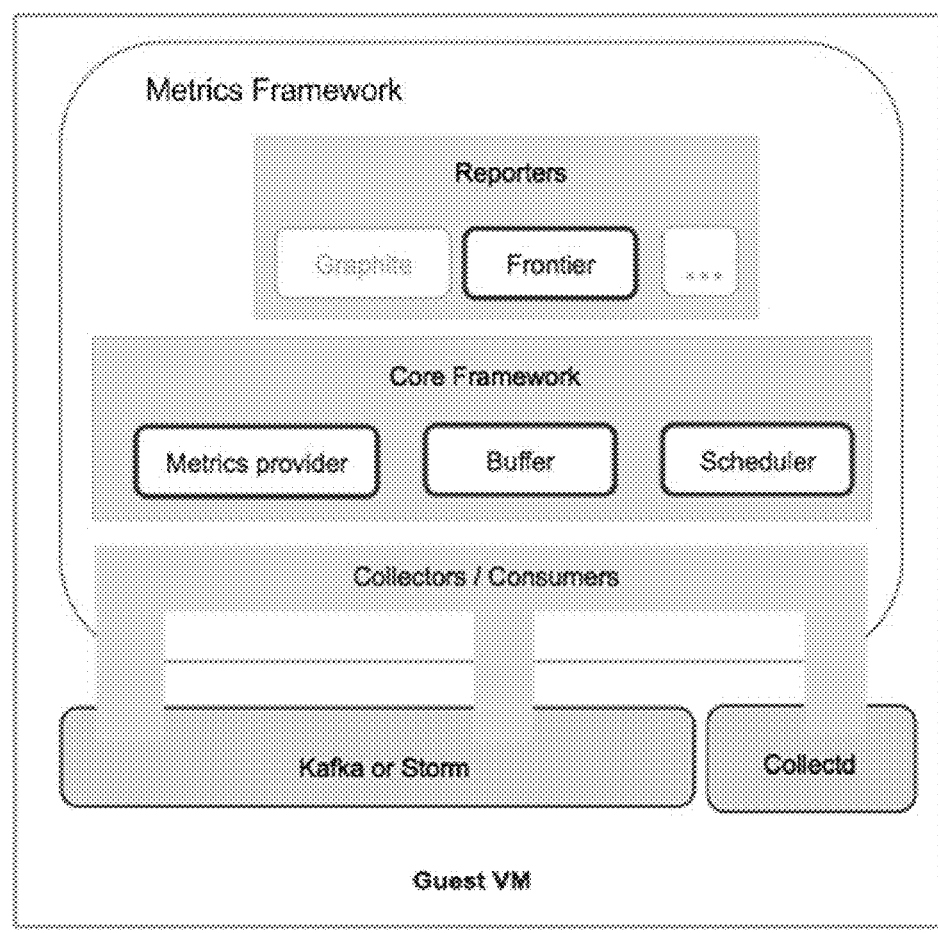
FIG. 5 is an illustration depicting a high level design of a pluggable metrics collection, aggregation, and reporting framework, in accordance with some embodiments.

In some example embodiments, the present disclosure provides a method and system that provide a pluggable metrics collection, aggregation and reporting framework, such as the metrics framework discussed above. The metrics framework comprises a very lightweight framework to bring together metrics providers/collectors and reporters. It provides a thin abstraction to various metrics collectors to write to different end-point destinations in a uniform way using a single metrics reporter interface. FIG. 5 is an illustration depicting a high level design of a pluggable metrics collection, aggregation, and reporting framework, in accordance with some embodiments.

The pluggable metrics framework of the present disclosure can transparently normalize and collect metrics in either a push or pull manner from various sources (e.g., Kafka, Storm, and Collectd), combining the push and pull functionality into a single mechanism. Accordingly, a user can plug in and play any number of reporters dynamically at runtime or at deployment time. The metrics framework comprises the ability to add and modify metadata associated with metrics, as well as being equipped with a management interface, such as Java Management Extensions (JMX) interface, and having configurable metrics set to collect and report.

Figure 6:
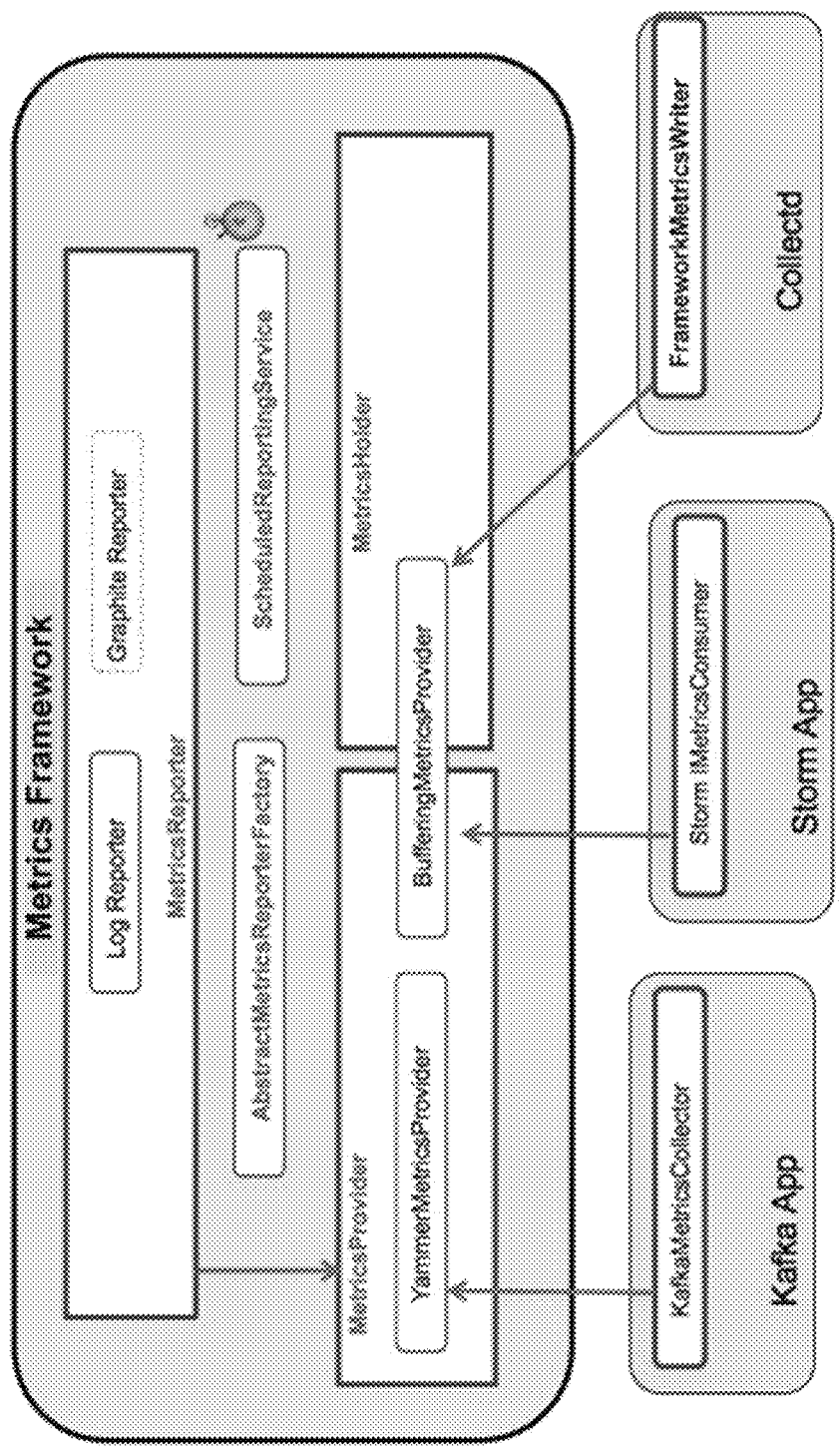
FIG. 6 is an illustration depicting interfaces and classes of a pluggable metrics collection, aggregation, and reporting framework, in accordance with some embodiments.

FIG. 6 is an illustration depicting interfaces and classes of a pluggable metrics collection, aggregation, and reporting framework, in accordance with some embodiments. In some example embodiments, the pluggable metrics framework handles multiple aspects of streaming data and is extensible. Different reporter types (e.g., Graphite and Telemetry reporters) or different collectors/providers of metrics can be added. For example, a metrics dashboard (e.g., Graphite) and Log File reporters can be provided, and Kafka and Storm collectors can also be provided, integrating with native metric aggregation (push/pull) interfaces that Kafka/Storm already provide. A collectd Java writer plugin can be employed to route any number of metrics reported by the read plugins to the framework core, from where they can be transported to the configured reporting back-ends. The reporting service is based on scheduled thread pool executors and the interval time, and other aspects are fully configurable. The reporting service is robust and can run in its own thread(s) and does not impact the main application threads (e.g., the sources of the metrics).

In some example embodiments, the streaming application(s) 132 use an orchestration engine (e.g., Heat) and open source configuration management utility (e.g., Puppet) scripts on the guest agent side to provision and then configure the guest agent VMs. Zookeeper, Kafka, and Storm clusters can be provisioned to build streaming topology infrastructure. As part of this provisioning, the scripts also instrument the guest agent nodes with framework jar and the appropriate metrics collection jars (e.g., Kafka-Metrics for Kafka nodes and Storm-Metrics for Storm nodes).

A collect-metrics jar can also be deployed and a collectd service can be configured to run an embedded JVM and startup a collectd writer plugin (e.g., collectd service and JDK can be part of the guest agent base image).

In some example embodiments, aspects of this instrumented guest agent monitoring setup are configurable (e.g., statically by editing a task manager conf), and thus is global to all deployed topologies. In some example embodiments, a CLI/UI-based mechanism can be provided to customize this per provisioned streaming topology by providing the ability to specify custom metrics/monitoring related parameters (e.g., reporter type, end point url, metric filters) at provisioning request time.

In some example embodiments, collectd 'Read' plugins collect data about a module/process/system, and write plug-ins transport the collected metrics to destinations such as TSDBs and graphing and monitoring systems. collectd comprises read plugins. A user can edit the collectd contlg file to enable/disable/add whichever read/write plugins the user wants. The default configuration file that comes with collectd enables certain operating system read plugins (e.g., CPU, RAM, processes) which collect about 80-100 different metrics about the operating system already.

Figure 7:
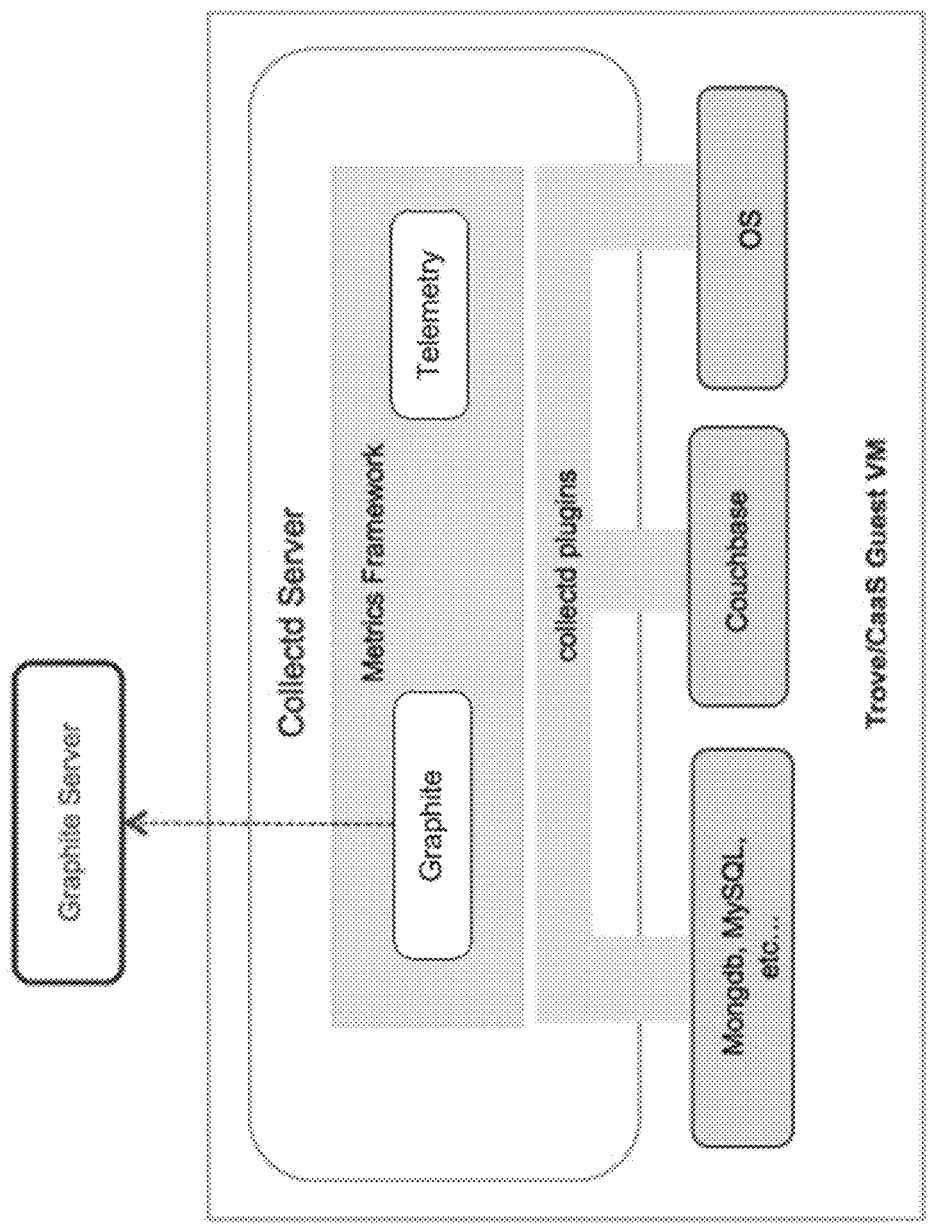
FIG. 7 is an illustration depicting a plugin sending metrics to different destinations, in accordance with some embodiments.

FIG. 7 is an illustration depicting a plugin sending metrics to different destinations, in accordance with some embodiments. As shown in FIG. 7, the collectd writer plugin sends all the metrics collected by all the configured read plugins to the various reporters (e.g., a metrics dashboard, such as Graphite).

In some example embodiments, for any XaaS, the work remaining comprises:

a) Writing any additional collectd read plugins (if the available plugins are not enough) using language of their choice (e.g., bash, Python, Java). For example, one can write specific collectd plugins for MySQL/MongoDB datastore or Couchbase. These could be simple bash scripts that check port, process health, and/or invoke data collection tools already made available by the datastore/service for example to collect metrics about the datastore/service.

b) Configuring those read plugins in collectd config. As long as the plugins are conformant to the read-plugin requirements, no more additional integration is needed. When the collectd daemon is started, these read plugins are automatically activated and pump data to the configured writers.

Figure 8:
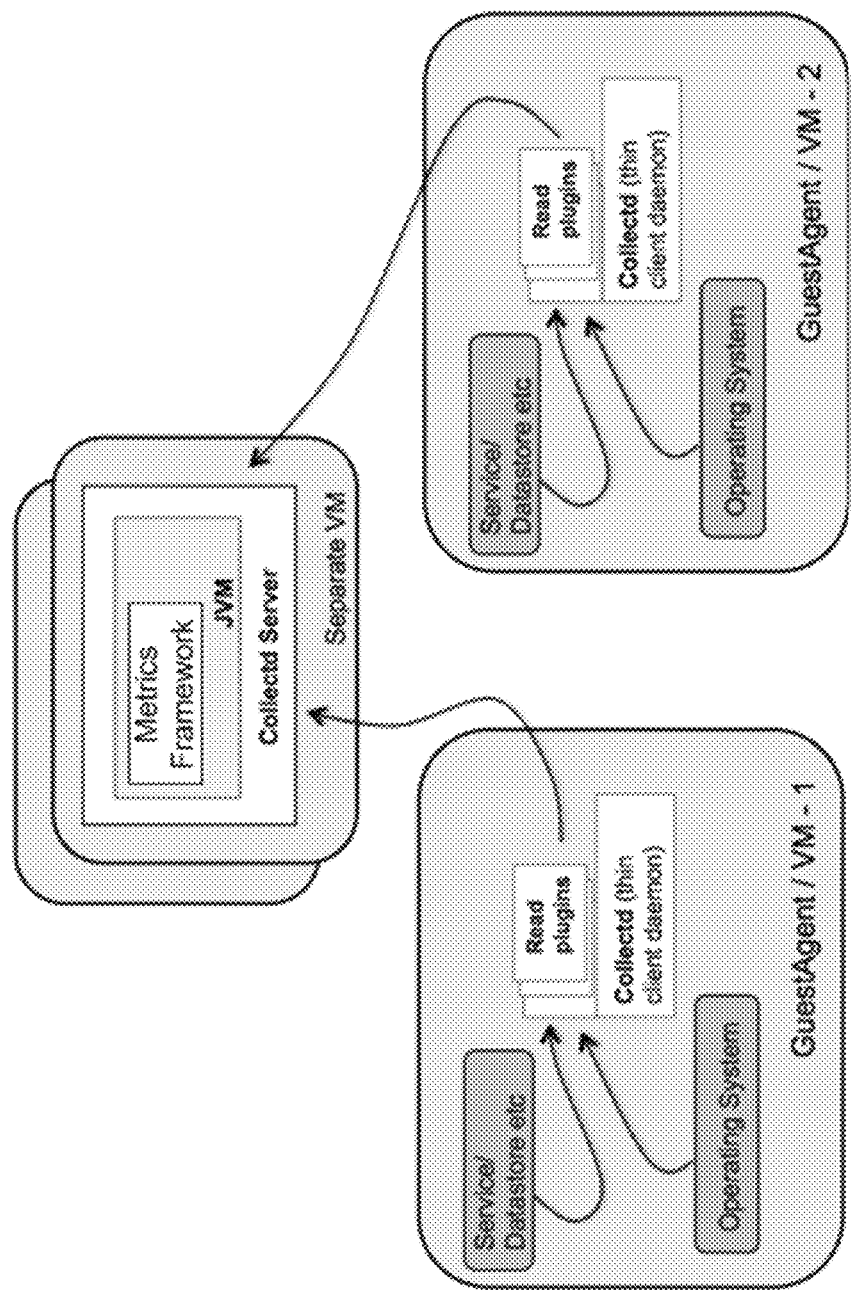
FIG. 8 is an illustration depicting the use of a thin daemon on every node routing their collected metrics via an external server, in accordance with some embodiments.
Figure 9:
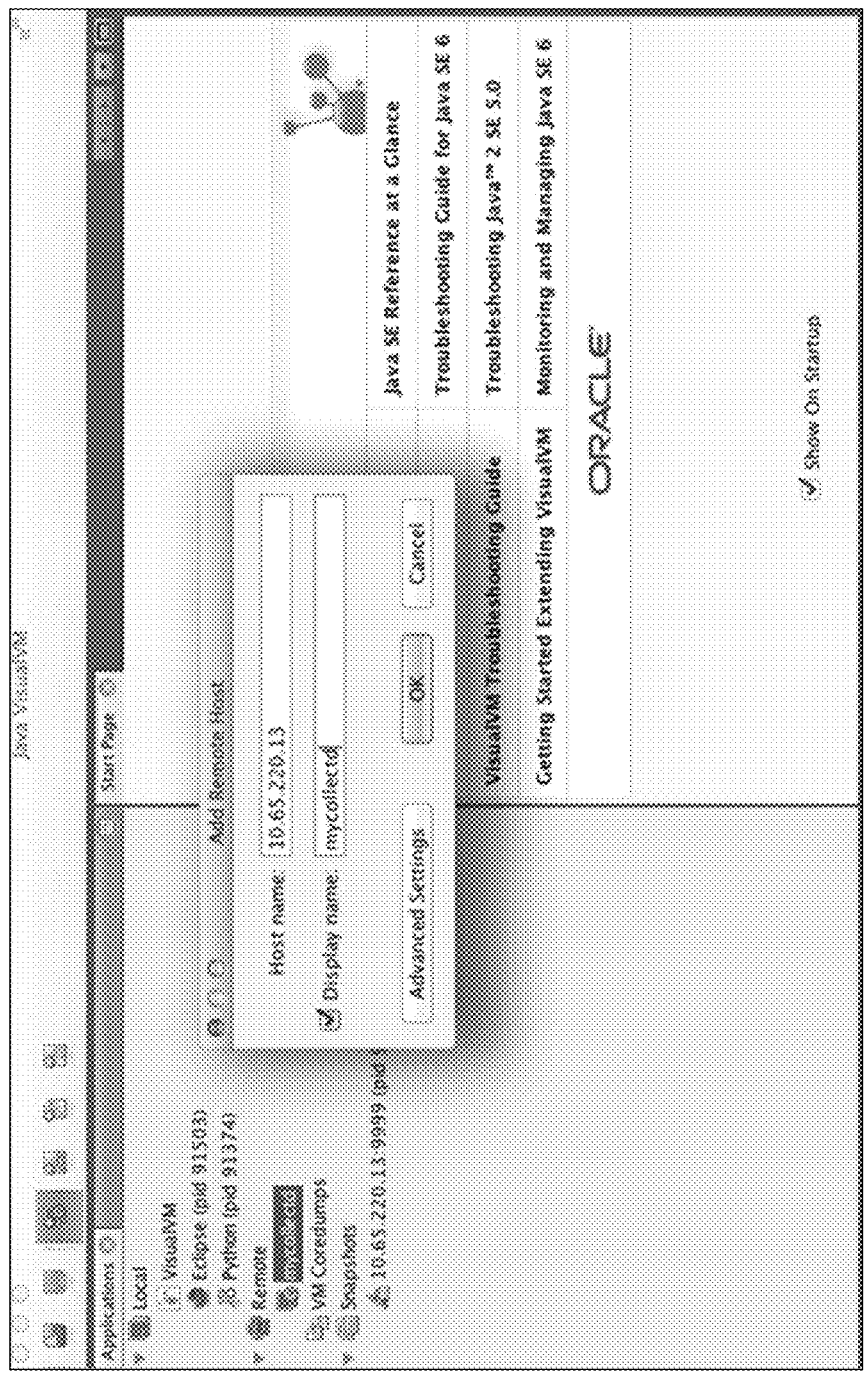
FIGS. 9-13 are screenshots of a user interface configured to enable configuration of remote access, in accordance with some embodiments.
Figure 10:
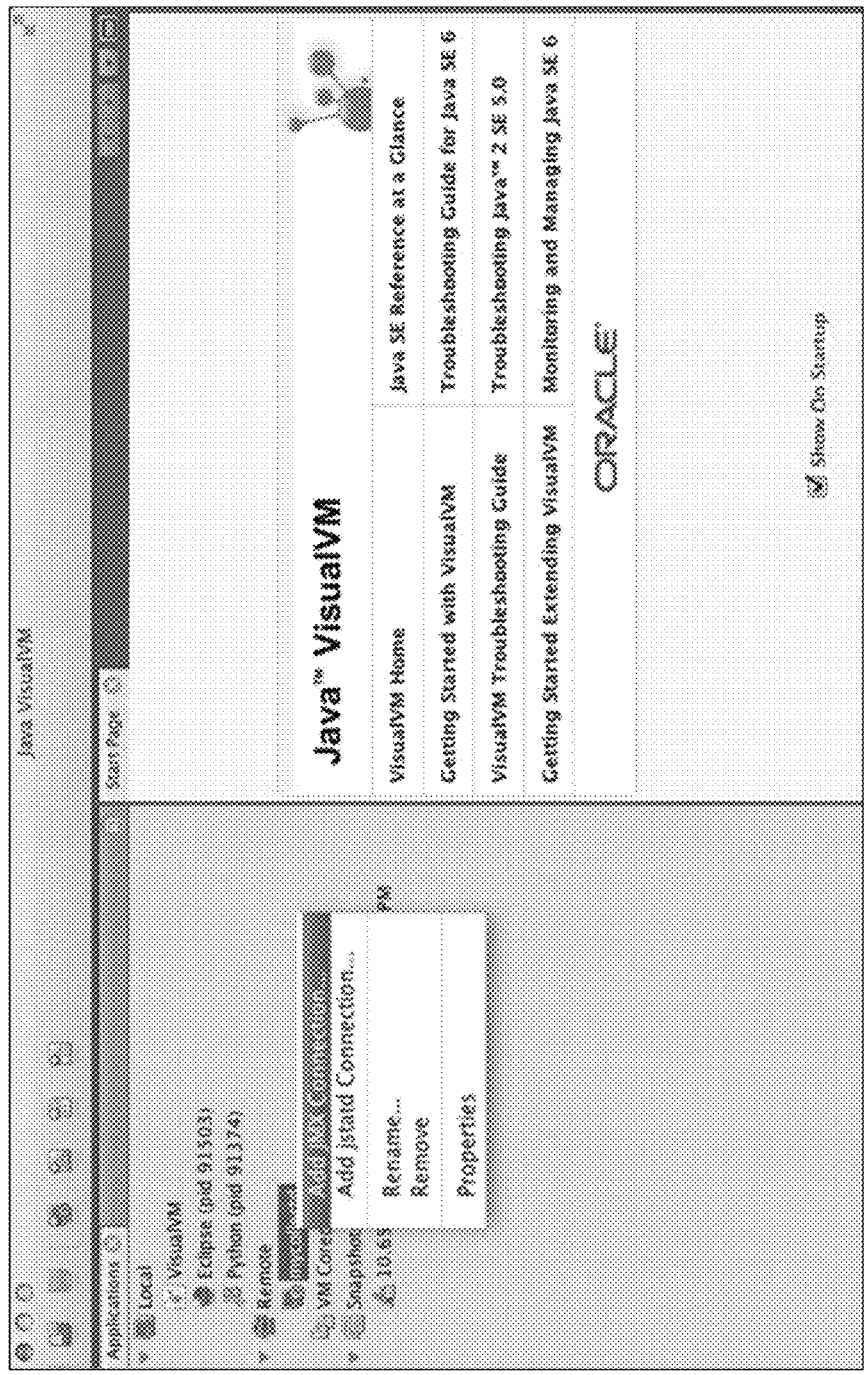
Figure 11:
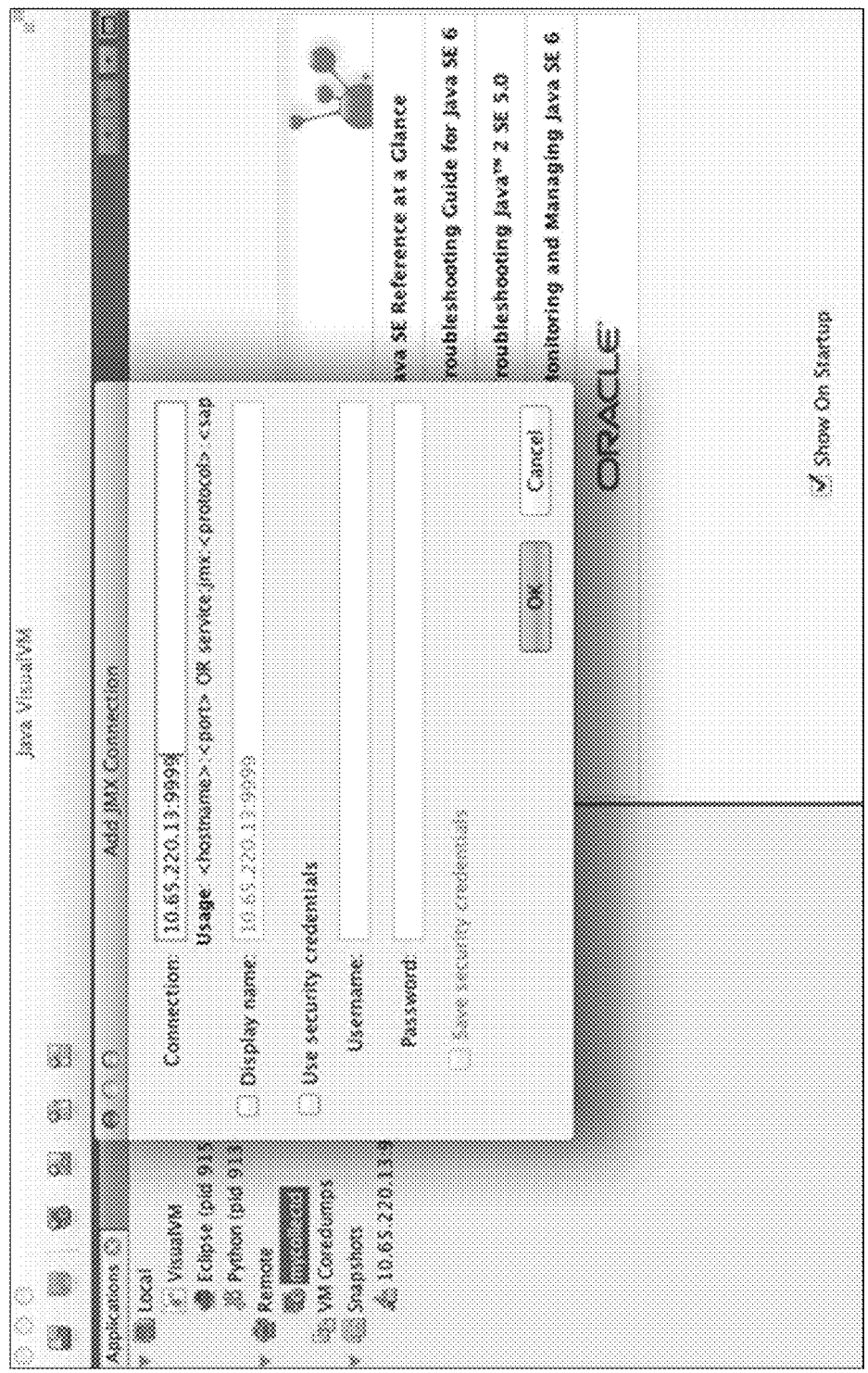
Figure 12:
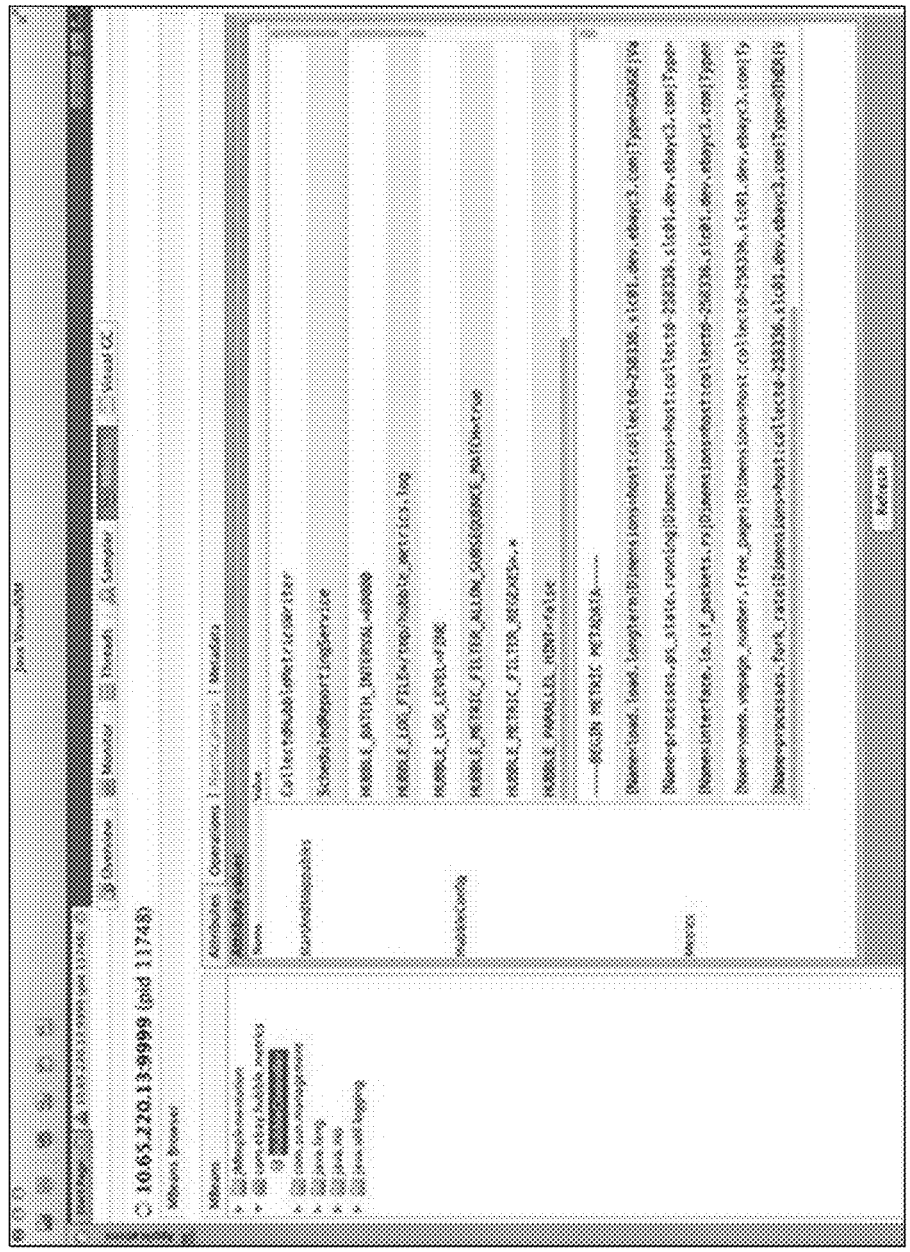
Figure 13:
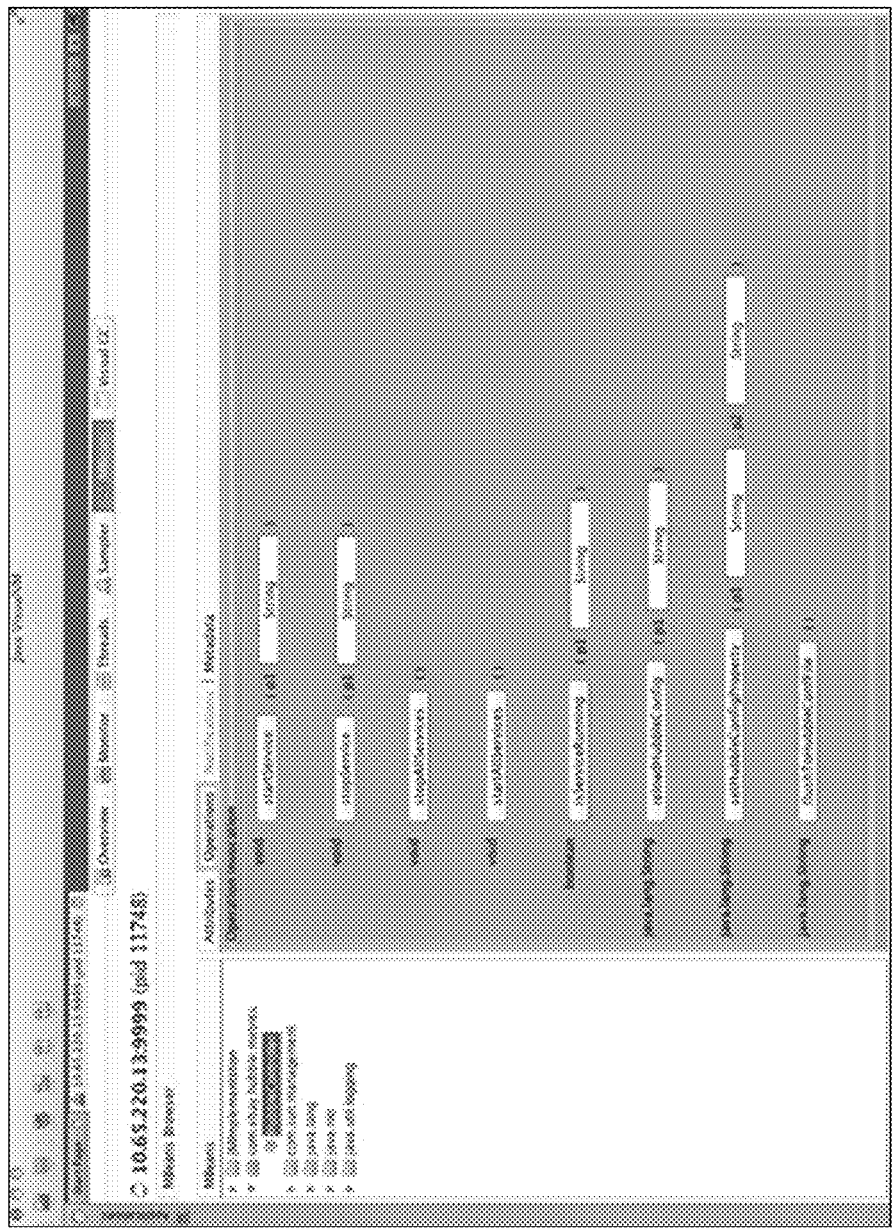

In some example embodiments, if there are concerns with having a collectd server process with embedded JVM running on each node of the cluster, then an alternative approach is to use a "thin collectd daemon" on every node and let all the thin clients route their collected metrics via an external collectd server (or a cluster of collectd servers for high-availability (HA) clusters). FIG. 8 is an illustration depicting the use of a thin daemon on every node routing their collected metrics via an external server, in accordance with some embodiments.

The user can configure the collectd client-server setup in a variety of different ways. For example, the user can configure the setup to have one collectd server (or an HA cluster) provisioned per every XaaS topology the user is provisioning. It can be automatically provisioned as part of the topology provisioning process. Additionally, it can avoid any central management of a cluster of collectd servers since this would be within the tenant space and per topology. Furthermore, it can result in no single point of failure that might impact all topologies provisioned. In another example, the user can configure the setup to have a global collectd server/cluster for all tenants that are using the XaaS, resulting in less wasted resource.

The metrics framework exposes a JMX managed java object (e.g., MBean) which allows the user to inspect metrics, config, and certain metadata. It also allows some management control and ability to dynamically update configuration properties.

To enable remote access to the controller MBean, the JVM which is going to load the metrics framework (and collectors/reporters) can be launched with the following system properties:

Deem.sun.management.jmxremote.port=9999
Deem.sun.management.jmxremote.authenticate=false
Deem.sun.management.jmxremote.ssl=false Once the JVM app that has the metrics framework modules is launched (e.g., with properties like above) to enable remote access to the MBeans, then a visual JMX agent like jvisualvm (with its MBean plugin) can be used to access the controller MBean. FIGS. 9-13 are screenshots of a user interface configured to enable configuration of remote access, in accordance with some embodiments.

Filtering Out Unwanted Metrics for Reporting

In some example embodiments, the present disclosure provides a method and system to filter out unwanted metrics for reporting. A manageable (via JMX) interception point is configured to seamlessly control a list of metrics that are allowed to reach the reporting end points at a desirable frequency. This is achieved via a series of white-listed regular expressions specified in configuration.

In some example embodiments, the metrics framework comprises a management interface to which a user or system can monitor what metrics are getting collected. A user can modify the white-list, via the management interface, to add more metrics, take away metrics, change frequency, add different reporters dynamically, dynamically update configuration, and to perform other modifications.

Reporting Metrics to Multiple Endpoints

In some example embodiments, the present disclosure provides a method and system to report metrics to multiple endpoints. A mechanism is provided to dynamically add reporting end points so that the same set of metrics can be dispatched to multiple reporting endpoints in parallel, providing the ability to change the configuration and to change the parallelism.

Life Cycle Management API

In some example embodiments, the present disclosure provides a method and system to provide a life cycle management API to create, read, update and delete a stream topology with open source technologies (e.g., Zookeeper, Storm, Kafka). The API can also provide a mechanism to manage the provisioned streaming components. The API is configured to enable the provisioning of an infrastructure to allow streaming of data and the selection of the technology stack to be supported (e.g., Zookeeper, Kafka, Storm).

During the post-provisioning period, once a cluster (e.g., a Kafka cluster) has been deployed, a user can create a topic to sit on top of the cluster, providing the user with the ability to create a topic with a specific partition of the user's choosing. This can be accomplished without the end user seeing what is going on.

In addition to provisioning, a platform-as-a-service (PaaS) operation can be performed. A user can communicate with a guest VM, via a user interface, to make requests, such as a request for a list of all of the topics for a Kafka cluster or a request for a list of a Storm topology. The life cycle management API is configured to enable a user to manage the artifacts that have already been deployed in an abstract way without having to drill-down. The management API can implement the authentication to enable this management by the user. The API functions to allow the user to monitor what is going on in the clusters at a high level, as well as to provide a level of interaction through a console. The user can provide instructions to direct the clusters to perform operations, as well retrieve data (e.g., status, performance, health data) from the clusters. The user can use the API to perform create, read, update and delete (CRUD) functions to a specific level, delete a topology, deactivate a topology, re-activate a topology, create a topology, create a topic, update a topic, and more. The life cycle management API provided an abstraction layer for the user.

In some example embodiments, the Life Cycle Management API comprises and implements CRUD methods and management methods.

Such CRUD methods include, but are not limited to the following:

creating a streaming topology with any combination of clusters (e.g., Kafka, Storm, and/or Zookeeper clusters);

retrieving a list of managed streaming topologies;

adding capacity to an existing streaming topology; the capacity can be added any of the existing streaming component (e.g., Zookeeper, Kafka, and/or Storm clusters); if adding Zookeeper capacity, new Zookeeper host name(s) should also be added to the configuration of its dependent Kafka and/or Storm cluster(s); a proper and carefully orchestrated restart of the clusters is required;

removing capacity of an existing streaming topology; the capacity can be removed from any of the existing streaming component; if nodes are removed or decommissioned from an existing cluster, the removed Zookeeper nodes should be removed from the configuration of its dependent Kafka and/or Storm cluster(s); a proper and carefully orchestrated restart of the clusters is required; and deleting a streaming topology.

The management methods provide a mechanism for end users to manage the underlying streaming components (e.g., Zookeeper, Kafka, and Storm clusters). Only a tenant member can perform update or change related operations to the streaming components.

In some example embodiments, for Zookeeper clusters, the following management methods are employed:

stop and start a Zookeeper node;

stop and start a Zookeeper cluster;

update the configuration of an existing Zookeeper cluster; for example, end users should be able to update the snapshot count in the zoo.cfg; a proper restart of the Zookeeper cluster is required;

purge the existing Zookeeper data directory, where the snapshots and transaction log files are stored; and view the currant Zookeeper configuration.

In some example embodiments, for Storm clusters, the following management methods are employed:

stop and start a Storm node;

stop and start a Storm cluster;

deploy and redeploy a Storm topology with a set of worker and task related parameters;

gracefully stop or kill a running Storm topology; this operation should allow the existing Storm traffic to drain prior to a shutdown;

activate a Storm topology;

rebalance a running Storm topology; this operation dynamically increase or decrease the worker processes and/or the executors of a topology via Nimbus; a restart of the topology is not needed; and view the currently deployed Storm topologies and their configuration.

In some example embodiments, for Kafka clusters, the following management methods are employed:

stop and start a Kafka node;

stop and restart a Kafka cluster in a rolling manner;

create a topic;

delete a topic;

update one or more broker configuration;

balance a cluster;

recover from an unbalance cluster;

change log retention for a given topic; and rebalance partitions.

In some example embodiments, the Life Cycle Management API also comprises and implements health check methods, including, but not limited to the following:

check if a Zookeeper node is running (e.g., listening on port);
check the deployed Zookeeper version; and
check the health of the Zookeeper cluster.

Building any XaaS Based on API, Task Manager, and Guest Agent Architecture in a Pluggable Manner In some example embodiments, the present disclosure provides a method and system to build any XaaS based on an API, Task Manager, and Guest Agent architecture in a pluggable manner. It provides abstractions for component configuration, API, Task Manager, Guest Agent, database modeling, generic workflow creation and deletion tasks, Representational State Transfer (REST) endpoint configuration, and JavaScript Object Notation (JSON) Schema request validation.

Providing XaaS on OpenStack, or other open-source cloud computing platforms, is challenging. A user has to write the code from scratch. The present disclosure provides a framework that includes all of the appropriate corresponding code for providing an XaaS on OpenStack. The user can then simply plug in the code and start the logic command.

Looking at provisioning in the context of a cloud solution, a controller component knows how to access the underlying resources. However, the user needs to direct the guest VM that is being provisioned to do the actual work. The present disclosure provides a framework to address this issue. In some example embodiments, a controller is configured to direct the guest VM that is being provisioned on how to access the underlying resources and perform the appropriate tasks. The controller receives a request, parses it, identifies a series of steps, and builds a central messaging system, leveraging the underlying cloud environment as a communication vehicle to communicate back and forth with the guest VM.

Figure 14:
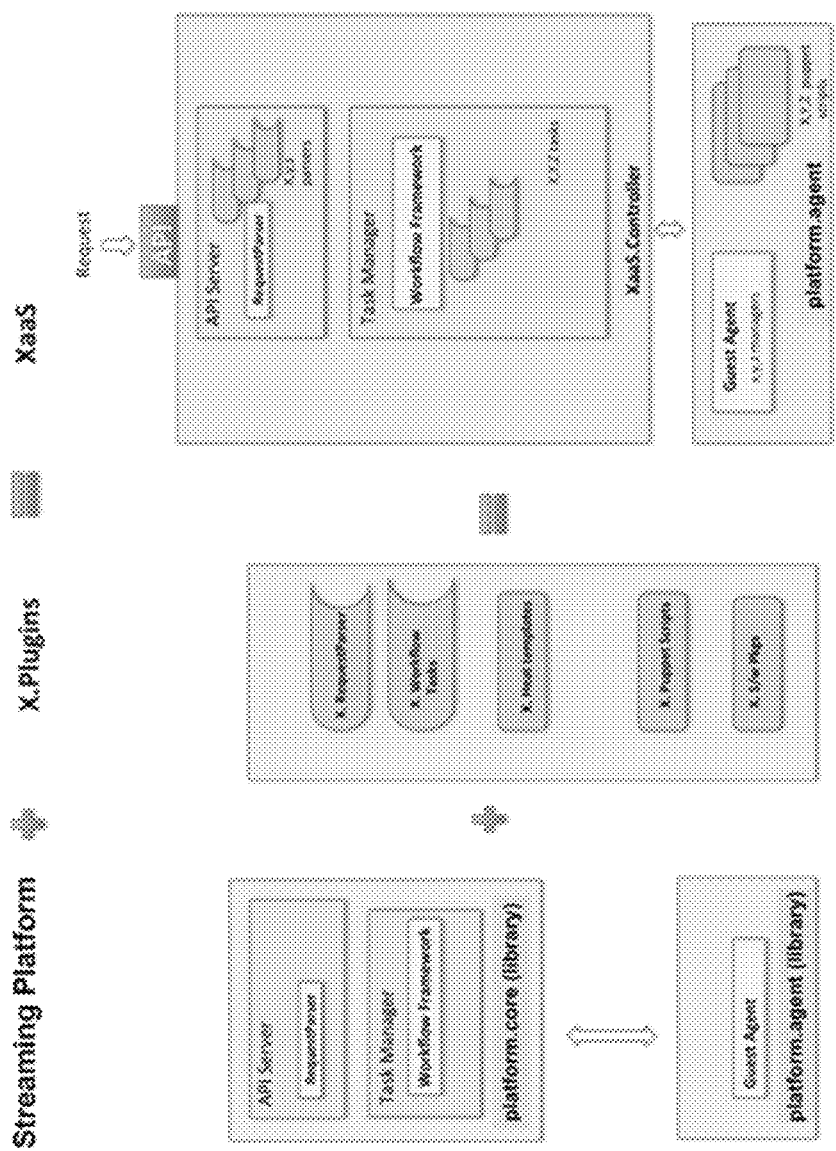
FIG. 14 is an illustration depicting a framework configured to enable the building of Anything-as-a-Service (XaaS) in a pluggable manner, in accordance with some embodiments.

FIG. 14 is an illustration depicting a framework configured to enable the building of an XaaS in a pluggable manner, in accordance with some embodiments.

In some example embodiments, the framework is configured to enable a user to create services with pluggable components, such as a request parser, a workflow, heat templates, and puppet scripts. The framework can be configured to enable the user to define the input parser, the request handler, and the API endpoint. The framework can then automatically create services based on this user input. The user does not have to worry about implementation details, such as how to get multiple requests, what component handles a request, what is the component on the VM going to be, and how a component will talk to the server side. The implementation details can be determined by the framework.

The framework of the present disclosure can provide the infrastructure for provisioning guest VMs, taking and executing commands, installing software, and transmitting heartbeat signals. The framework can be used to configure any XaaS, including any request parsers, orchestration engines, and workflow frameworks, as well as the configuration for how communication from the controller to the guest VMs is implemented.

Figure 15:
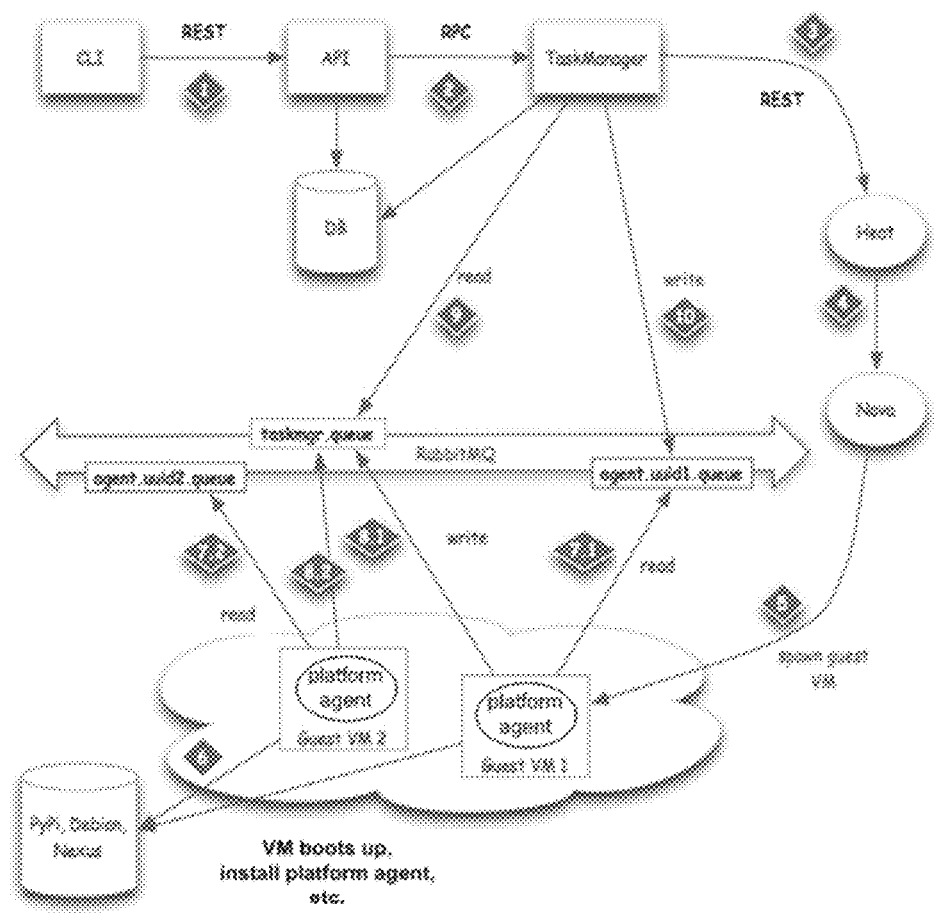
FIG. 15 is an illustration depicting an architecture for managing streaming components, in accordance with some embodiments.

FIG. 15 is an illustration depicting an architecture for managing streaming components, in accordance with some embodiments. In some example embodiments, the architecture is built on top of a distributed, scalable, pluggable, and shared nothing architecture that comprises: a command line interface (CLI), an API server (e.g., RESTful interface), a task manager (e.g., an RPC server), a streaming platform agent (e.g., an agent configured to manage communication between the streaming platform and guest VMs), a messaging system (e.g., RabbitMQ), and a workflow orchestration.

In some example embodiments, a controller of the architecture comprises an API (e.g., a RESTful API) and a task manager. For scalability and cross data center provisioning reasons, the task manager can live in a separate node. While a controller API is responsible for the resource's life cycle management (LCM) request/response, the associated task manager can coordinate the orchestration of the resource's life cycle states via a task-based, event-driven system. The communication between the guest VM and the controllers is via a messaging system.

Different life cycle management approaches can be employed. In some example embodiments, given user input, a streaming platform controller calls messaging (e.g., Kafka) and stream processing (Storm) controllers to create their orchestration (e.g., Heat) templates. Both the messaging and stream processing controllers can then independently initiate the orchestration of its cluster and both delegate the provisioning of their configuration/synchronization clusters (e.g., ZooKeeper clusters configured to maintain configuration information and provide distributed synchronization) to the configuration/synchronization controller (e.g., ZooKeeper controller configured to maintain configuration information and provide distributed synchronization). Upon receiving an HTTP 204 status code from the orchestration server (e.g., the Heat server), the associate stack IDs can be returned to the streaming platform controller, which can then save the stack IDs in the persistence store of the streaming platform. In some example embodiments, each controller is responsible for configuring the nodes in its cluster and across cluster(s) using one or more of the following methods.

In some example embodiments, a task-based method is used to configure the nodes. Upon software installation completion, each node in a cluster can publish a "setupCompleted" status on the streaming platform's message queue. The corresponding TaskManager asynchronously waits for the setupCompleted status from each node in the cluster. When the installation is completed in the entire cluster, the controller sends a "clusterSetupCompleted" status to the message queue. Upon seeing the "clusterSetupCompleted" status, each node in the cluster can then call a metadata service (e.g., Nova metadata service) for their peer's IP addressed and configure each node with that information.

In some example embodiments, a CFN method is used to configure the nodes. This method defers the cluster configuration to CFN callback and the metadata in the orchestration template (e.g., the Heat template). Upon receiving a 202 status code from a stack create call to the orchestration engine (e.g., the Heat orchestration engine), a controller can issue a stack update call the orchestration engine. The guest agent running on each node can periodically poll the metadata service for its cluster information.

Dynamically Provisioning Stream Processing Topologies

In some example embodiments, the present disclosure provides a method and system to dynamically provision stream processing topologies of heterogeneous composition and variable cardinality of the component clusters in a modular, extensible and reusable fashion using dynamically generated workflows based on just the details supplied via provisioning request In some example embodiments, the system is implemented using a polymorphic flow creator that can generate the appropriate executable workflow by stitching together the required tasks of the workflow into a directed acyclic graph representation, which can then be executed by a workflow engine. A mechanism can be provided in such a system whereby the aforementioned flow creator can automatically adjust dynamically to the cardinality of requested cluster size(s) and composition of the topology components to output the appropriate executable workflow with no other additional information or intervention other than simply parsing the data provided via the input.

A workflow library where a user can provide graphs of input can execute them in the order in which the graph is defined. Applying that to the creation of the streaming pipeline, an input can be taken and used to automatically construct this graph. The user does not have to manually add different steps for different topologies. For example, if a topology has Kafka clusters, Storm clusters, and ZooKeeper clusters, there can be any combination of these clusters. Using the defined input structure, a workflow graph generator of the present disclosure parses that input structure and automatically expands the structure of the graph based on how many clusters it needs to provision. The workflow graph generator automatically transforms a topology provisioning request into a graph workflow automatically. In some example embodiments, every time the topology changes, such as by the addition of more clusters, the workflow graph generator adjusts to the change, dynamically generating a new graph based on the structure of the topology the user is requesting.

Dynamically Detect and Coordinate at Time of Handshake

In some example embodiments, the present disclosure provides a method and system to dynamically detect and coordinate at time of handshaking between two components. Unlike most other server and resource coordination architectures where the server keeps track of the resources and polls/waits for the exact resource to call back, the streaming platform architecture of the present disclosure can perform lazy coordination by not waiting, but rather detecting the resource's role and/or topology at time of the agent handshake, and then triggering the respective workflow, employing coordination between the task manager and the guest agent.

In some example embodiments, the task manager listens, and the VMs communicate to the task manager that they are up and ready, instead of the orchestration engine sitting and waiting and polling continuously. The present disclosure provides an asynchronous messaging system as a communication mechanism between the task manager and the guest VM that is being provisioned.

In some example embodiments, there is a specific correlation ID sitting in the payload of the message that is coming back to the task manager from the guest agent. The correlation ID corresponds to the guest agent, and the task manager can correlate the message with the guest agent and determine that the guest agent is up and running. In this respect, the task manager is able to identify which guest agent a handshake is occurring on. When handling multiple nodes for a specific cluster, the task manager can identify which node corresponds to a handshake, thus identifying which node is ready, and which node the task manager can move to the next step. The task manager uses the ID of the handshake that was established when the provisioning was initiated in order to identify the corresponding node. Since the task manager can be running multiple orchestrations at the same time, the task manager can use the correlation IDs to identify which workflow a node belongs to.

Re-Claim and Re-Purpose Existing VM from One Type to Another

In some example embodiments, the present disclosure provides a method and system to re-claim and re-purpose an existing VM from one type to another. The streaming platform agent can dynamically change its role based on a single config parameter to manage from a group of homogeneous technologies (e.g., Kafka, Storm, Zookeeper, Spark). This is a useful feature as it enables the system to reclaim a VM without decommissioning and to repurpose the same VM for some other role in the topology. In some example embodiments, multiple guest agents reside on a VM. The StaaS platform performs the coordination of the guest agents and instructs each guest agent what tasks or operations to perform.

VMs can be general VMs, which can be repurposed by the system at any time. The VMs can be repurposed when coordination is being performed as a new cluster is being started up, and the VMs can be repurposed to change one resource to another without deleting the VM.

In some example embodiments, the identified a VM and boots up basic resources for that VM. At that point, the VM is ready for use. The system can then instruct the VM as to what kind of machine it will act as, and installs additional software on the VM to configure the VM as a special-purpose VM. The special-purpose VM can then be used for one or more specific jobs. When the jobs are completed, instead of the VM being taken down, it can be assigned a new role. The system can load software onto the VM to configure it as a different type of special-purpose VM, thereby repurposing the VM (e.g., changing the VM from a Kafka VM to a ZooKeeper VM). This repurposing can provide the rebalancing of resources based on load balancing considerations and requirements at any stage. A load can be reallocated via repurposing based on the capacity of the resources.

Installing Specific Version of Software at Boot Time

In some example embodiments, the present disclosure provides a method and system to install a specific version of software at boot time. In some example embodiments, when provisioning a cluster, the system enables a user to specify what version of a component to use. Based on that version information, the system configures the corresponding node for that respective version, instead of just using a default VM.

Currently, a user is fixed with whatever software packages are on the node. The system of the present disclosure can provide flexibility by enabling a user, via a command-line interface (CLI) command, to provide instructions to install a specific version or the latest version of software at boot time. The system provides the end user with the ability to pick and choose a specific software version to be installed on the node at boot time, thereby providing the ability to update software packages without taking the node down. In some example embodiments, the system can determine what version to install based on intelligence being applied to a configuration or input file that indicates certain tasks or operation that are to be performed.

Stream Processing of Database State Change

In some example embodiments, the present disclosure provides a method and system for stream processing of database state change. DBStraaS enables a user the ability to create a complete stream processing flow for real-time stream processing of database state change based purely on user provided configuration information describing general performance, scalability, and availability requirements. This system can completely provision, deploy, and configure on the OpenStack cloud infrastructure an integration data log cluster for capturing and messaging the changed data events, a stream processing cluster for processing the changed data events, and can enable the transaction log reading mechanism on the database to flow the data change events from the database to the integration data log. The entire process can be completely automated, including establishing the connections and flow between the different components in the system, so that a user has data change events flowing through the stream when the process is complete. This system allows for the addition of additional stream processors and integration data logs to be chained together in the stream and create forks in the stream for new streams.

The system provides real-time data and near real-time data. Currently, in the field of analytics and risk detection, extract, transform and load (ETL)-like data is used, resulting in a significant amount of time elapsing (e.g., a few hours to a few days) before the data is available for use.

The system of the present disclosure provides much faster availability of the data. In some example embodiments, the system detects database state changes. A database state change can comprise a change from schema to another schema. For example, in using tables, a new column might be added based on an application deployment. The system is configured to detect a sudden change in a stream and then we reacts to the change. The system can properly capture the corresponding log entry, and can issue the proper notification to the end user or start utilizing the data based on whatever capability is needed or desired.

In one example, the system can determine that certain items of a seller have become popular items, and the system can generate a notification to the seller (e.g., "your purse is a hot sell right now, so go ahead and obtain more inventory"). The system provides the infrastructure with the basic capability to stream the data out of the database. The system can detect that there is a change in the data and can then adapt to the change.

Figure 16:
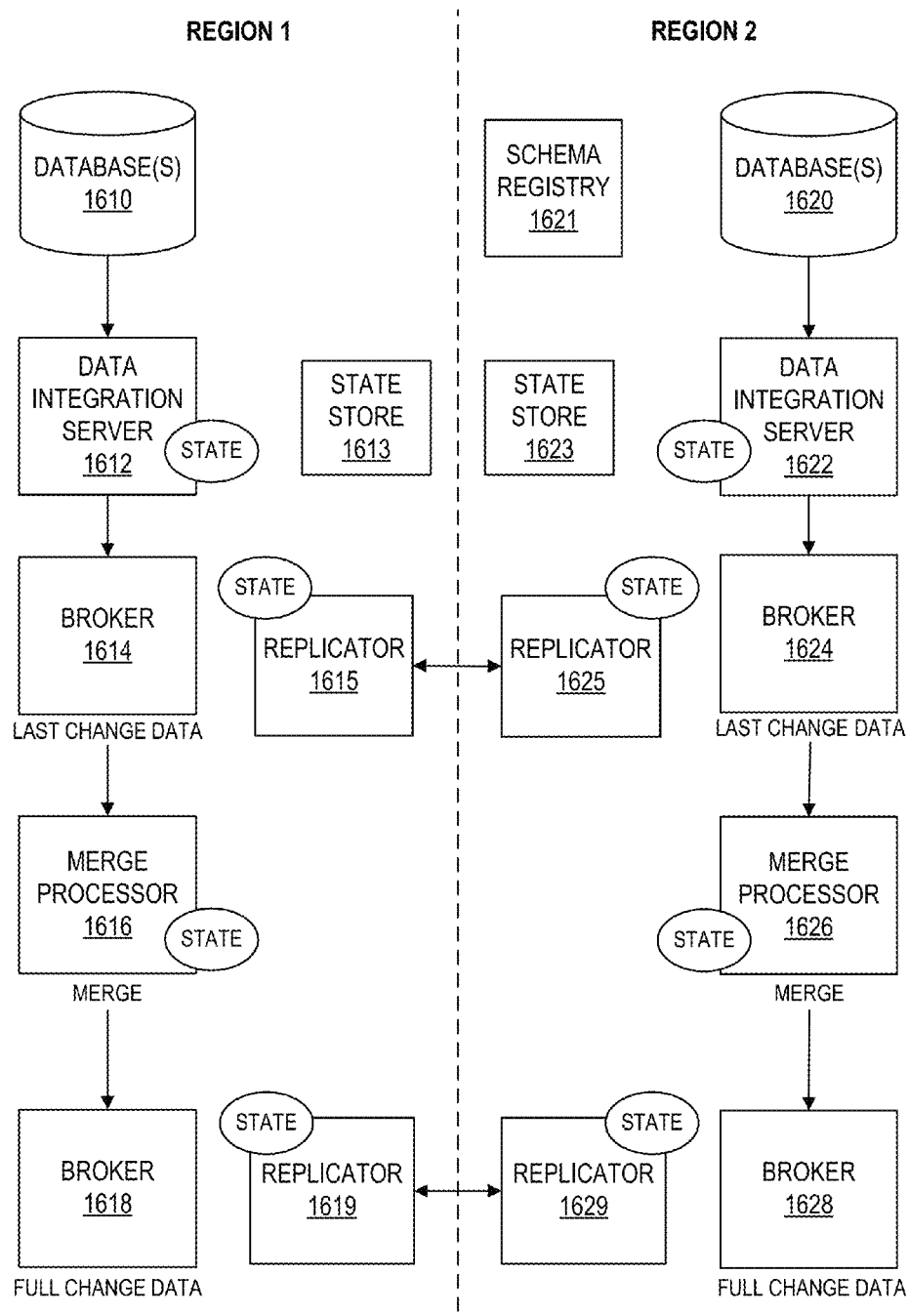
FIG. 16 is an illustration depicting a database streaming deployment system architecture, in accordance with some embodiments.

Database Stream Switchover from One Data Center to Another with Notification at Each Component FIG. 16 is an illustration depicting a database streaming deployment system architecture, in accordance with some embodiments. The system architecture provides database streaming to external applications. The system architecture can comprise multiple data centers spread across multiple regions, such as region 1 and region 2 in FIG. 16. In some example embodiments, the system architecture comprises a first data center in region 1 and a second data center in region 2. The first data center comprises one or more databases 1610 on a database host, and the second data center comprises one or more databases 1620 on another database host. Each database 1610, 1620 can comprise one or more tables of data. Tables of data can be sharded across the multiple databases and data centers.

The system architecture also comprises a corresponding data integration server (e.g., data integration servers 1612, 1622), a corresponding last change record (LCR) cluster broker (e.g., LCR cluster broker 1614,1624), a corresponding merge processor (e.g., 1616, 1626), and a corresponding full change record (FCR) broker (FCR cluster broker 1618, 1628) for each region data center. The system architecture can also comprise a corresponding replicator (1615, 1625) for each LCR cluster broker, and a corresponding replicator (1619, 1629) for each FCR cluster broker. Each replicator can be configured to perform data mirroring from one cluster (e.g., a cluster in region 1) to another cluster (e.g., a corresponding cluster in region 2). The system architecture can further comprise corresponding storage (e.g., state store 1613, 1623) for the states of each component. The system architecture can also comprise a schema registry 1621.

In some example embodiments, the database(s) 1610 sends data to the data integration server 1612. The data can comprise change data (e.g., deltas) that represent blocks of data in the corresponding table(s) that have been changed. This change data can comprise a primary key and a column ID corresponding to the change of data in the table(s). The data integration server 1612 can transform a format of the change data into a data serialization format based on a corresponding schema identification, which can be retrieved from the schema registry 1621.

In some example embodiments, the data integration server 1612 transmits the change data to the LCR cluster broker 1614, which acts as a service broker for a cluster of machines. The LCR cluster broker 1614 stores the change data in its corresponding LCR cluster of machines. In some example embodiments, only this last change data is stored in the LCR cluster of machines.

In some example embodiments, the replicator 1615 initiates a mirroring of the last change data to one or more other data centers, such as the second data center in region 2, thereby copying this last change data to the other data center(s), where it can be stored in a corresponding LCR cluster of machines. Each time a change in data is detected by the data integration server 1612, it can trigger the LCR cluster broker 1614 to store and mirror the corresponding change data.

In some example embodiments, the merge processor 1616 is configured to reconstruct the entire corresponding row for each last change record or event. In some example embodiments, the merge processor 1616 performs this reconstruction by finding and merging the record associated with the last change record in the source database host. For example, the merge processor 1616 can find, in database(s) 1610, the record associated with the last change record, and then merge the last change data with the record to form a reconstructed record. The merge processor 1616 then published this reconstructed record to the FCR cluster of machines, such as via the FCR cluster broker 1618. The replicator 1619 can initiate a mirroring of the full change data to one or more other data center, such as the second data center in region 2, thereby copying this full change data to the other data center(s), where it can be stored in a corresponding FCR cluster of machines.

These operations can be performed by the components of the second data center in the reverse direction as well, with the mirroring being performed in the direction of the first data center.

In certain situations, a switchover or failover event may occur. Such a switchover or failover event can be detected by the system architecture, such as by the data integration server 1612.

Upon each database host switchover, the data streams associated with the extracted tables can be switched over as well. In some example embodiments, this system orchestrates a sequence of stops in one data center and a sequence of starts in another. Starting at the source database host, this system can first stop the extraction on the source database host, and then perform a well-orchestrated series of stops at the data integration server, at the LCR data mirroring, at the merge stream processor, and finally at the FCR data mirroring. After this stop, the system can initiate source extract on the switched over data center with an offset, followed by a well-orchestrated series of starts at the data integration server, at the LCR data mirroring, at the merge stream processor, and finally at the FCR data mirroring with the known offset. The offset represents the location within the data stream or within the corresponding table at which the extraction process was stopped due to the switchover or failover event. The orchestration allows this system to maintain the data order for our downstream consumers by employing the offset.

Figure 17A:
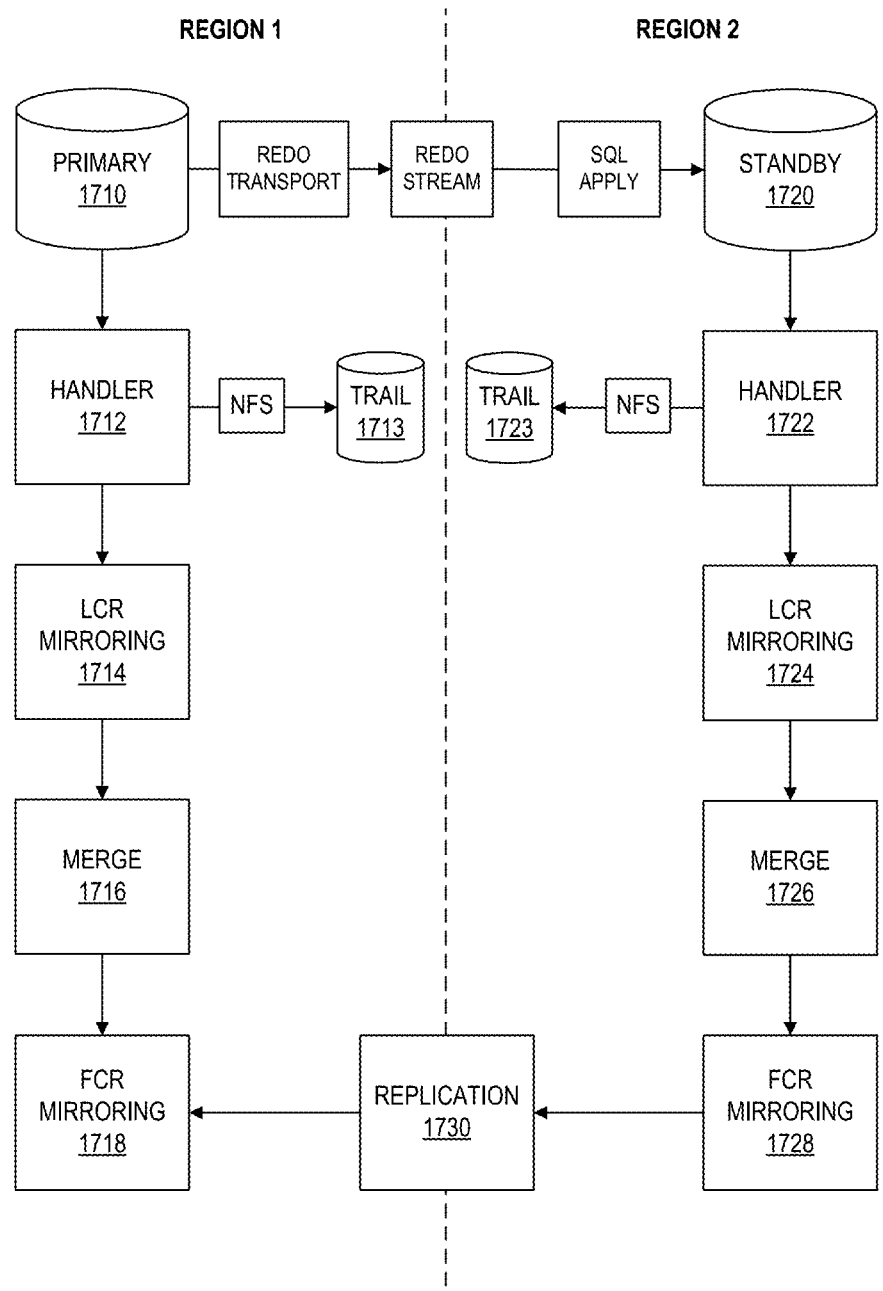
FIGS. 17A-17C illustrate different stages of a database streaming failover strategy, in accordance with some embodiments.
Figure 17B:
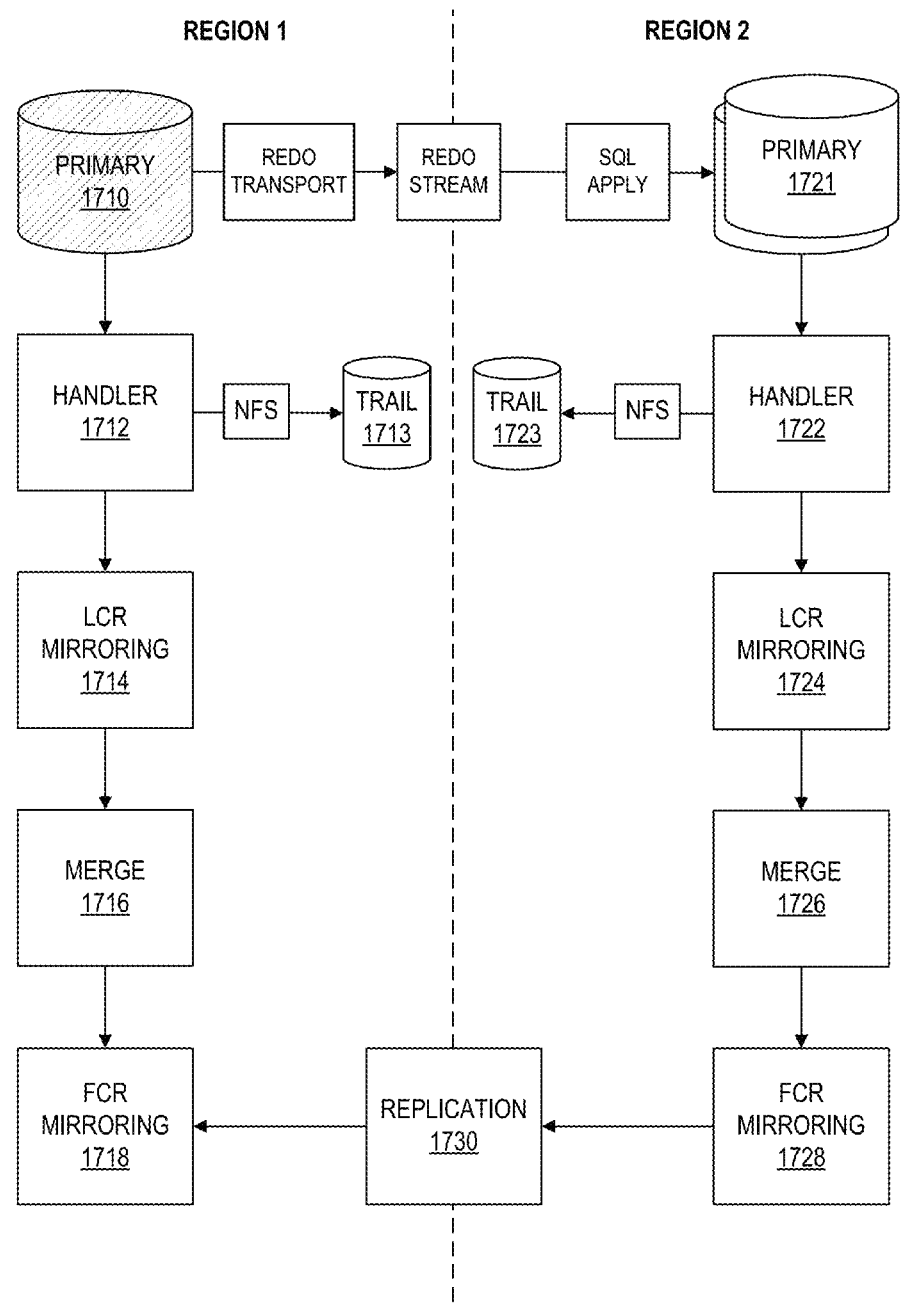
Figure 17C:
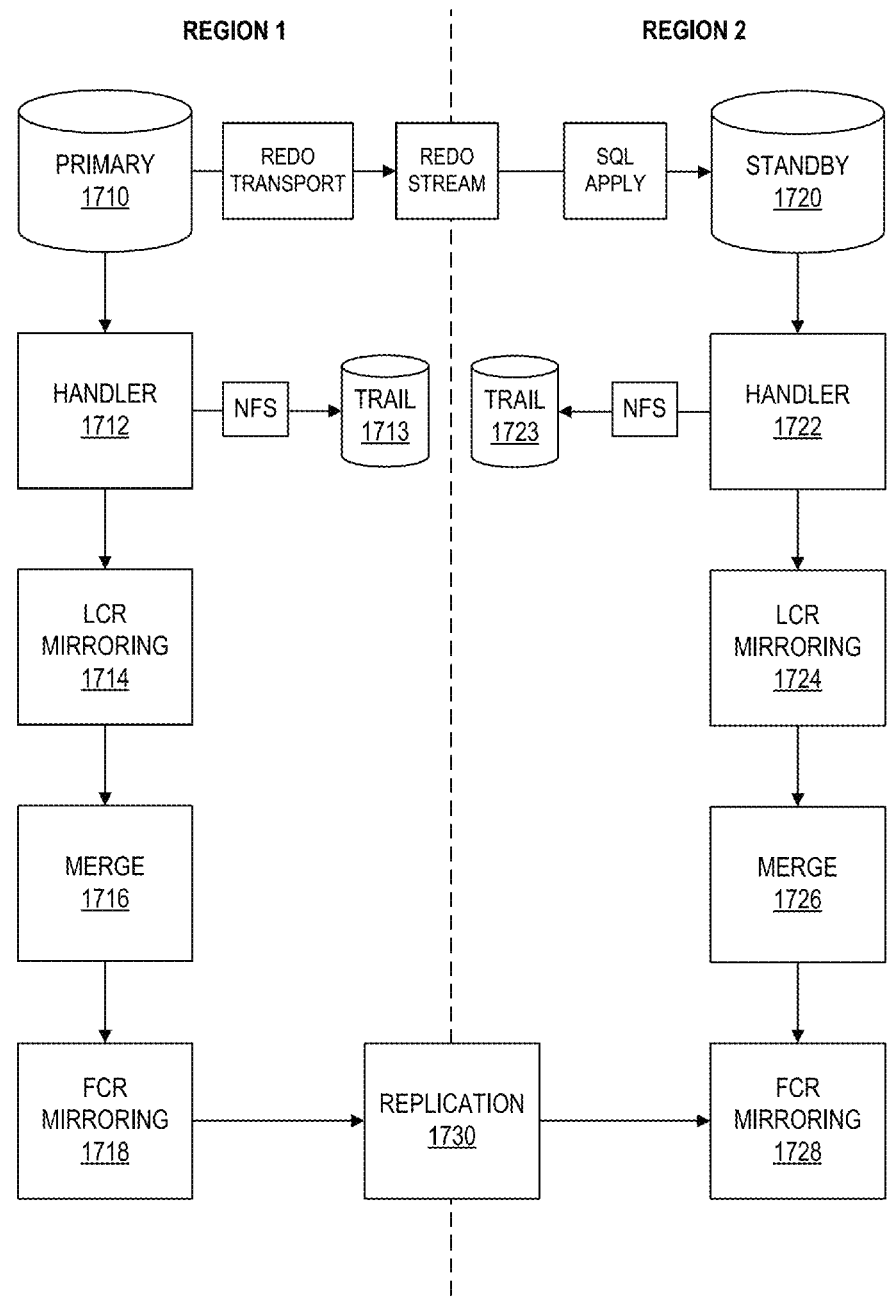

FIGS. 17A-17C illustrate different stages of a database streaming failover strategy, in accordance with some embodiments. In FIG. 17A, a data extraction is running as a primary data extraction on a primary host 1710, while another data extraction is running as a standby on a standby host 1720, prior to a switchover or failover event. Here, a data integration server handler 1712 stores a trail 1712 of the extracted data using a network file system (NFS) protocol. An LCR mirroring process 1714 is performed, followed by a merge operation 1716, and then an FCR mirroring process 1718. Similar operations can be performed on the side of the standby host 1720, with a corresponding data integration server handler 1722, trail 1723, a LCR mirroring process 1724, a merge operation 1726, and an FCR mirroring process 1728. A replication process 1730 can be performed in the direction of the first data center in region 1.

FIG. 17B shows the state when the switchover or failover event occurs. Here, the primary host 1710 experiences the event, and a switchover or failover is performed so that the primary data stream is now provided from the second data center in region 2, with the standby host 1720 becoming a primary host 1721.

FIG. 17C. shows the state when the switchover or failover completes, with the direction of the replication 1730 reversing, and the primary host 1710 being restored as the primary source for the data stream.

Providing a Complete Set of Data in a Region Using N-Way Data Mirroring

With the data spread or sharded across different regions, the system provides the ability to conduct an n-way data mirroring from a single region via a REST API, with 'n' being any positive integer. The n-way mirroring allows for a complete set of data for a given table in the LCR and FCR data integration log clusters in each region.

Figure 18:
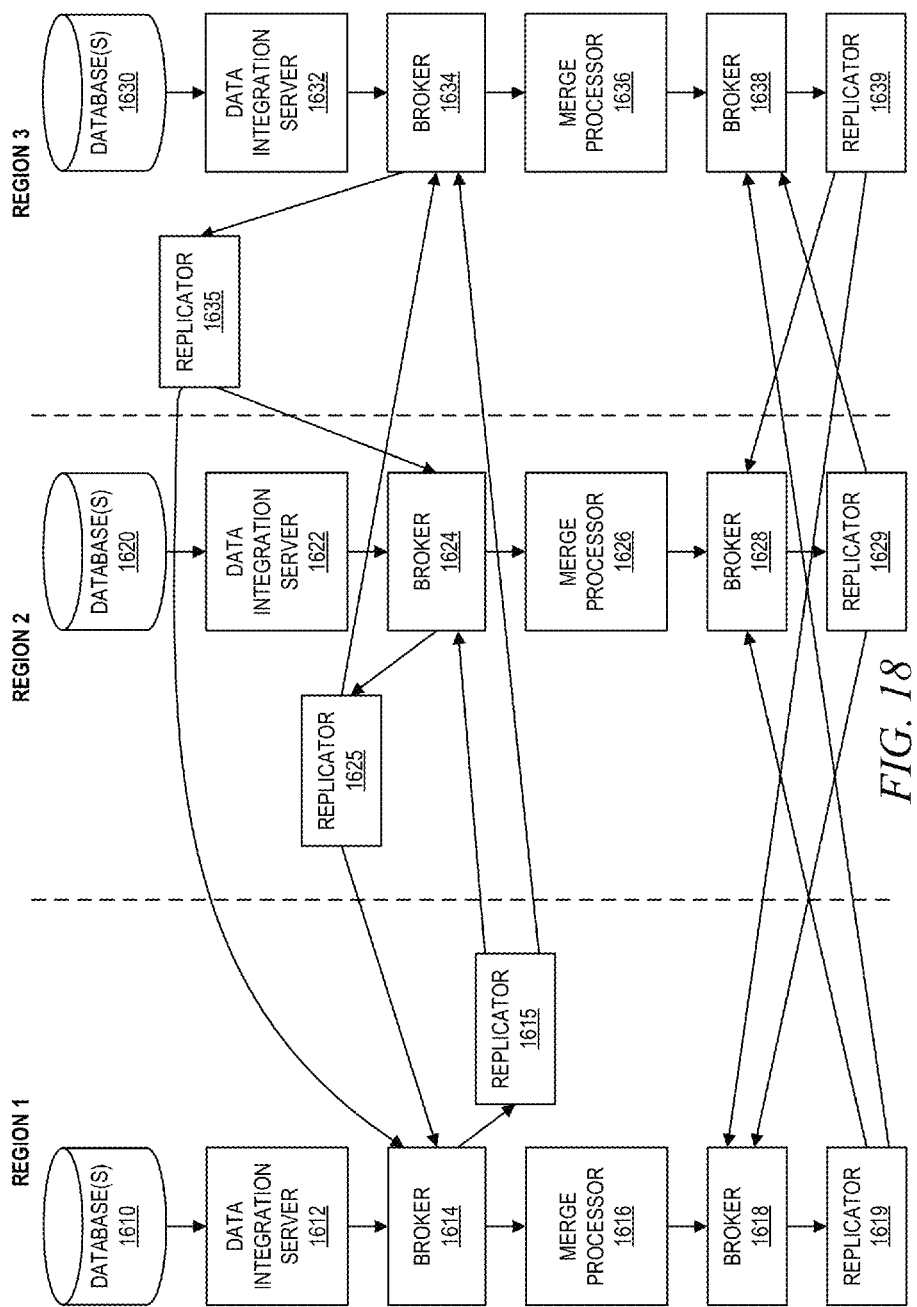
FIG. 18 illustrates a system for providing a complete set of data in a region using n-way data mirroring, in accordance with some embodiments.

FIG. 18 illustrates a system for providing a complete set of data in a region using n-way data mirroring, in accordance with some embodiments. As seen in FIG. 18, a third region (region 3) is added to the first and second regions of FIG. 16. This third region comprises components corresponding to those of the first and second regions, including one or more database(s) 1630, a data integration server 1632, an LCR cluster broker 1634, a merge processor 1636, and an FCR cluster broker 1638. Each region can comprise a corresponding replicator for its LCR and FCR cluster brokers. For example, region 1 comprises a replicator 1615 for the LCR cluster broker 1614 and a replicator 1619 for the FCR cluster broker 1618, region 2 comprises a replicator 1625 for the LCR cluster broker 1624 and a replicator 1629 for the FCR cluster broker 1628, and region 3 comprises a replicator 1635 for the LCR cluster broker 1634 and a replicator 1639 for the FCR cluster broker 1638. Each region's replicator(s) can replicate the region's LCR and FCR data to the other regions. Although FIG. 18 shows only three regions, it is contemplated that any number of regions is within the scope of the present disclosure.

Processing Database Change Events on One or More Tables from a One or More Database Hosts without Code Changes In some example embodiments, for each specific type of events received from a data host, this system is designed to start and to stop a change event capture process to transform the event into a particular data serialization format (e.g., Apache Avro) message based on a given schema ID in the event header. Subsequently, the event capture process can publish the message into the LCR data integration log for further processing as needed. The event capture process is schema agnostic and is capable of processing any data type. This flexibility allows for the processing of any number of tables in a single event capture process without any code changes.

Performing Merge Operation on One or More Tables from One or More Database Hosts without Code Changes In some example embodiments, for each specific type of events in the LCR data integration log, this system is designed to start and to stop a stream processing instance to reconstruct the entire data row for a given table. Each stream processor instance is schema agnostic and is capable to perform the merge operation for one or more tables based the given configuration upon startup. The merge processor can also detect change data source change (from primary to secondary or vice versa) and dynamic connect to the correct data host for the merge operation. This configuration driven model and data source change capability allow for seamless performance of the required merge operations for hundreds of tables and database hosts without code changes. Also, the system allows for the processing of any number of tables in a single processor for ease of database switch over. For example, one can easily configure and start a stream processor to handle the tables from a given database host for ease of subsequence database switch over without any code changes.

Tracking the State of Each Component in a Database Streaming Ecosystem (Event Capture Process, Stream Merge Processor, and Data Mirroring)

In some example embodiments, this system provides a REST State Management Service that allows each component in the database streaming ecosystem to record their state, such as running versus not running. If the component is in a running state, it also periodically records information of what it does, the last processed data timestamp, which database host and table that it processes, which region(s) it mirrors the received data to. Besides allowing for the monitoring of the state of each component, this system also provides a way to introspect the stream direction, data flow information and the freshness of the stream. At a glance, this system can easily provide a hint on whether the stream is healthy or not. And if not healthy, where the problem might be for a quick recovery.

Dynamically Detecting and Adapting to a DDL Change without Restarting the Data Consuming Process In some example embodiments, with each data change event expressed in a data serialization framework (e.g., Avro) and its schema recorded in the schema registry, downstream consumers can reliably serialize and deserialize each event. In addition, a registry REST interface allows consumers to discover available topics and their metadata information. Furthermore, this system enables consumers to dynamically detect and adapt to data definition language (DDL) changes without restarting the process.

Managing the Data Mirroring Direction on Demand

In some example embodiments, at runtime, this system provides a way to control the data mirror direction via a start and a stop on a mirroring process via a REST API. Because of this, remote seamless orchestration of a switchover is enabled.

Figure 19:
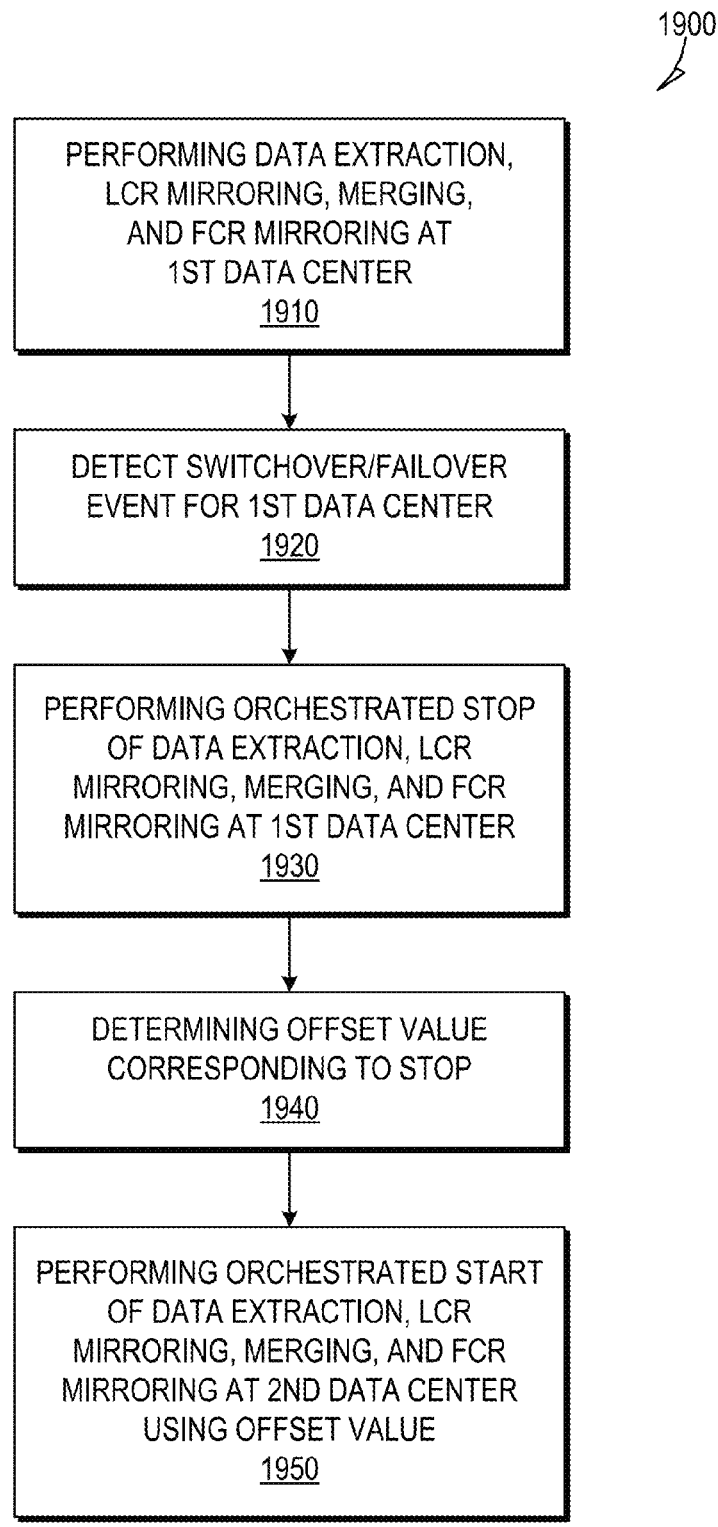
FIG. 19 is a flowchart illustrating a method of database streaming failover, in accordance with some embodiments.

FIG. 19 is a flowchart illustrating a method 1900 of database streaming failover, in accordance with some embodiments. The operations of method 1900 can be performed by a system or modules of a system. The operations of method 1900 can be performed by processing logic that can comprise hardware (e.g., circuitry, dedicated logic, programmable logic, microcode, etc.), software (e.g., instructions run on a processing device), or a combination thereof. In one example embodiment, the method 1900 is performed by the streaming application(s) 132 of FIGS. 1-3 or one or more components of the system architecture of FIG. 16.

At operation 1910, a data extraction process is performed. The data extraction process comprises: a first extraction of a data stream from a first table of data in a first database host at a specific location within a data stream, the first database host storing a first table of data, the data stream comprising change data of the first table, the change data comprising data in the first table that has changed; a first last change record (LCR) mirroring of the change data at the specific location within the data stream, the first LCR mirroring comprising a copying of last change data of the first table from a first LCR cluster of machines in the first data center to a second LCR cluster of machines in a second data center, the second data center having a second database host storing a second table of data; a first merging of last change data in the first LCR cluster of machines with previously harvested last change data stored in a first full change record (FCR) cluster of machines in the first data center; and a first FCR mirroring of the harvested last change data at the specific location within the data stream, the first FCR mirroring comprising a copying of the harvested last change data from a first FCR cluster of machines in the first data center to a second FCR cluster of machines in the second data center.

At operation 1920, a switchover event or a failover event for a first database host of a first data center is detected.

At operation 1930, in response to detecting the switchover event or the failover event, an orchestrated stop of a data extraction process is performed. The orchestrated stop comprises: stopping a first extraction of a data stream from the first table of data in the first database host at a specific location within the data stream, the data stream comprising change data of the first table, the change data comprising data in the first table that has changed; subsequent to stopping the first extraction of the data stream from the first table of data, stopping a first last change record (LCR) mirroring of the change data at the specific location within the data stream, the first LCR mirroring comprising a copying of last change data of the first table from a first LCR cluster of machines in the first data center to a second LCR cluster of machines in a second data center, the second data center having a second database host storing a second table of data; subsequent to stopping the first LCR mirroring, stopping a first merging of last change data in the first LCR cluster of machines with previously harvested last change data stored in a first full change record (FCR) cluster of machines in the first data center; and subsequent to stopping the first merging, stopping a first FCR mirroring of the harvested last change data at the specific location within the data stream, the first FCR mirroring comprising a copying of the harvested last change data from a first FCR cluster of machines in the first data center to a second FCR cluster of machines in the second data center.

At operation 1940, an offset value indicating the specific location within the data stream is determined.

At operation 1950, an orchestrated start of the extraction process is performed in the second data center using the offset value. The orchestrated start comprises: starting a second extraction of the data stream from the first table of data in the second database host at the specific location within the data stream using the offset value; subsequent to starting the second extraction of the data stream from the first table of data in the second database host, starting a second LCR mirroring of the change data at the specific location within the data stream, the second LCR mirroring comprising a copying of last change data of the first table from the second LCR cluster of machines in the second data center to another LCR cluster of machines in another data center; subsequent to starting the second LCR mirroring, starting a second merging of last change data in the second LCR cluster of machines with previously harvested last change data stored in a second FCR cluster of machines in the second data center; and subsequent to starting the second merging, starting a second FCR mirroring of the harvested last change data at the specific location within the data stream, the second FCR mirroring comprising a copying of the harvested last change data from the second FCR cluster of machines in the second data center to another FCR cluster of machines in the other data center.

It is contemplated that the operations of method 1900 can incorporate any of the other features disclosed herein.

It is contemplated that any features of any embodiments disclosed herein can be combined with any other features of any other embodiments disclosed herein. Accordingly, these any such hybrid embodiments are within the scope of the present disclosure.

Figure 20:
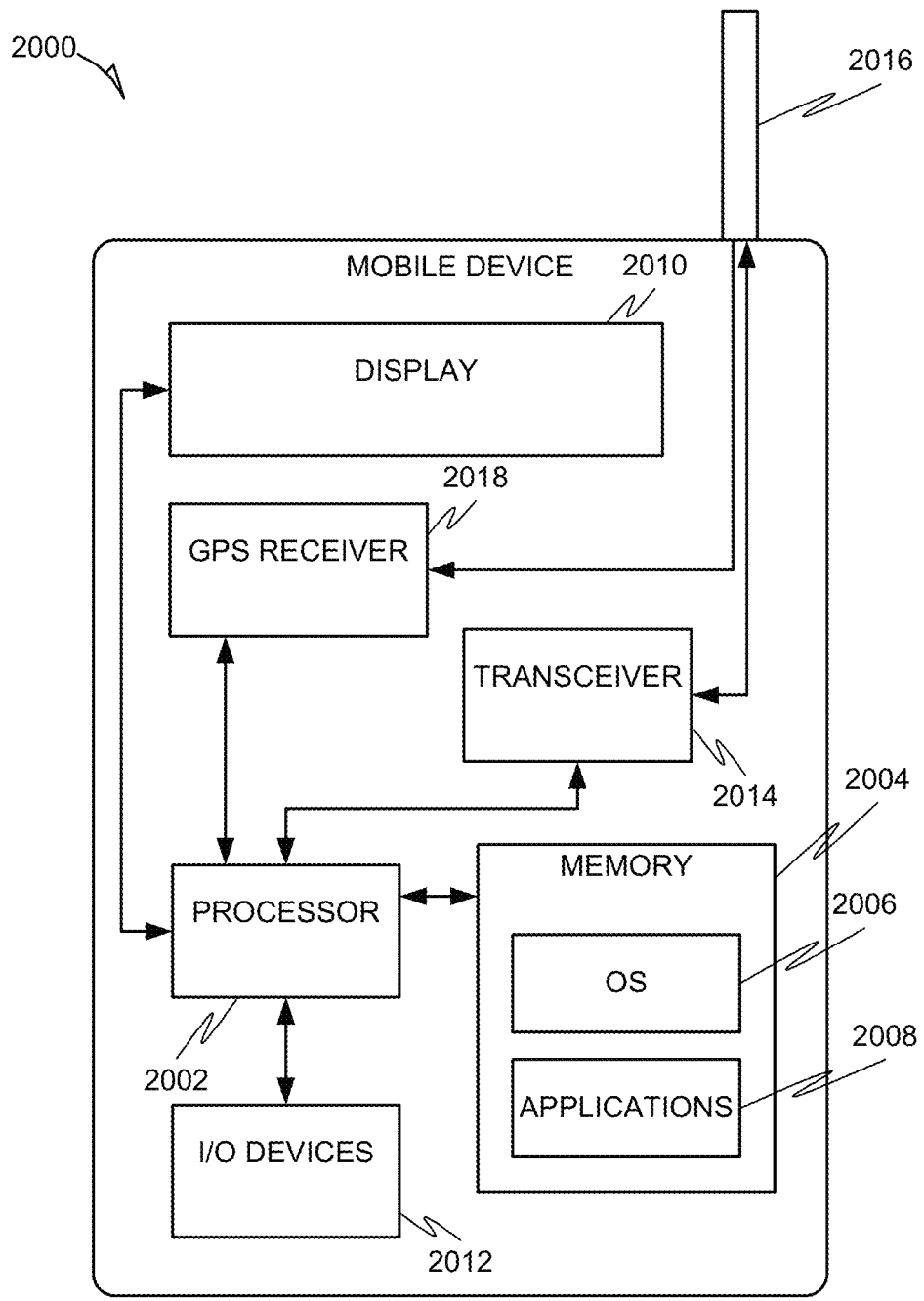
FIG. 20 is a block diagram illustrating a mobile device, in accordance with some example embodiments.

FIG. 20 is a block diagram illustrating a mobile device 2000, according to some example embodiments. The mobile device 2000 can include a processor 2002. The processor 2002 can be any of a variety of different types of commercially available processors suitable for mobile devices 2000 (for example, an XScale architecture microprocessor, a Microprocessor without Interlocked Pipeline Stages (MIPS) architecture processor, or another type of processor). A memory 2004, such as a random access memory (RAM), a Flash memory, or other type of memory, is typically accessible to the processor 2002. The memory 2004 can be adapted to store an operating system (OS) 2006, as well as application programs 2008, such as a mobile location enabled application that can provide LBSs to a user. The processor 2002 can be coupled, either directly or via appropriate intermediary hardware, to a display 2010 and to one or more input/output (I/O) devices 2012, such as a keypad, a touch panel sensor, a microphone, and the like. Similarly, in some example embodiments, the processor 2002 can be coupled to a transceiver 2014 that interfaces with an antenna 2016. The transceiver 2014 can be configured to both transmit and receive cellular network signals, wireless data signals, or other types of signals via the antenna 2016, depending on the nature of the mobile device 2000. Further, in some configurations, a GPS receiver 2018 can also make use of the antenna 2016 to receive GPS signals.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA)

or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 104 of FIG. 1) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 21:
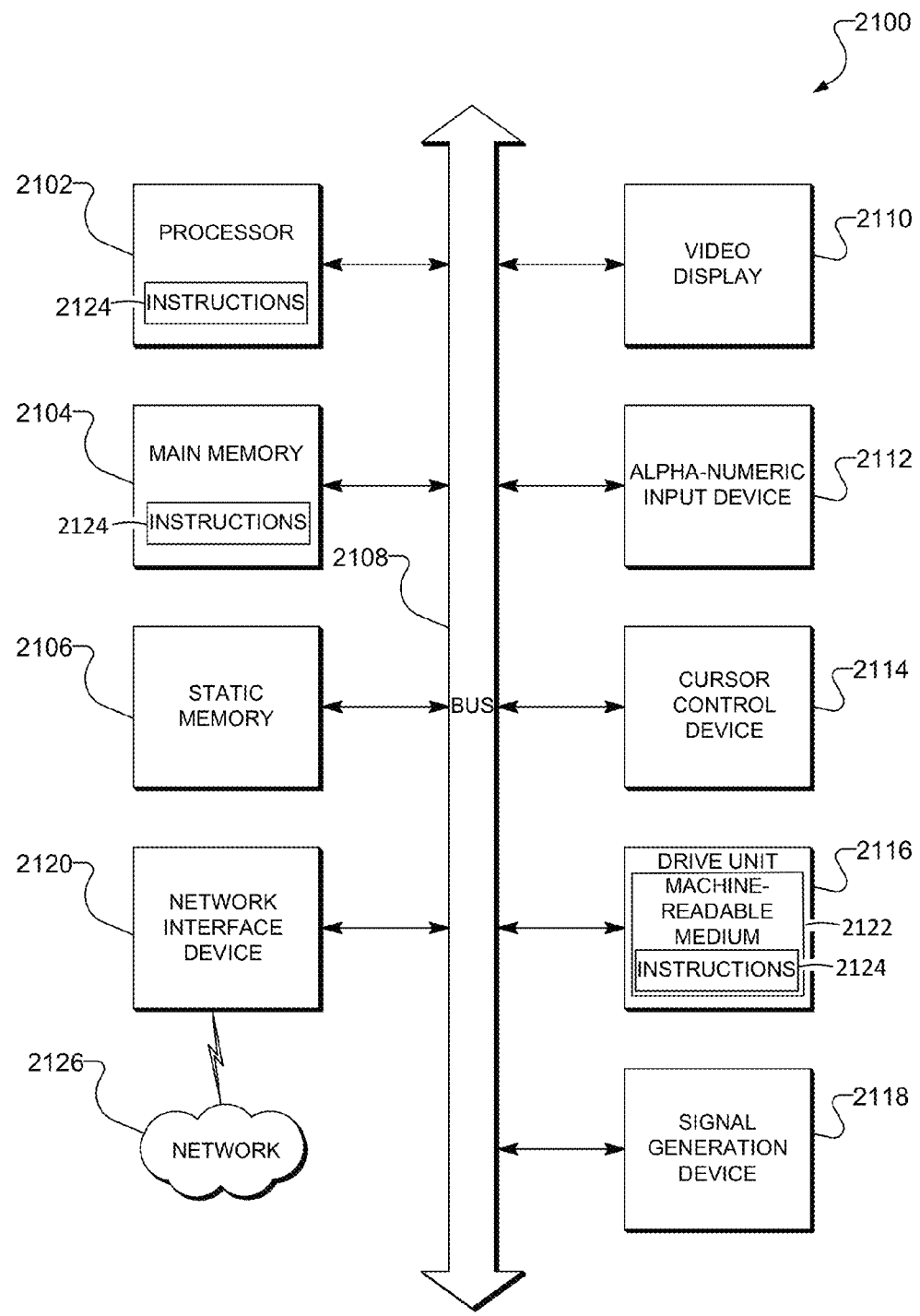
FIG. 21 shows a diagrammatic representation of a machine in the example form of a computer system within which a set of instructions may be executed to cause the machine to perform any one or more of the methodologies discussed herein, in accordance with some embodiments.

FIG. 21 is a block diagram of a machine in the example form of a computer system 2100 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 2100 includes a processor 2102 (e.g., a central processing unit (CPU), a graphics processing unit (GPU) or both), a main memory 2104 and a static memory 2106, which communicate with each other via a bus 2108. The computer system 2100 may further include a video display unit 2110 (e.g., a liquid crystal display (LCD) or a cathode ray tube (CRT)). The computer system 2100 also includes an alphanumeric input device 2112 (e.g., a keyboard), a user interface (UI) navigation (or cursor control) device 2114 (e.g., a mouse), a disk drive unit 2116, a signal generation device 2118 (e.g., a speaker), and a network interface device 2120.

The disk drive unit 2116 includes a machine-readable medium 2122 on which is stored one or more sets of data structures and instructions 2124 (e.g., software) embodying or utilized by any one or more of the methodologies or functions described herein. The instructions 2124 may also reside, completely or at least partially, within the main memory 2104 and/or within the processor 2102 during execution thereof by the computer system 2100, the main memory 2104 and the processor 2102 also constituting machine-readable media. The instructions 2124 may also reside, completely or at least partially, within the static memory 2106.

While the machine-readable medium 2122 is shown in an example embodiment to be a single medium, the term "machine-readable medium" may include a single medium or multiple media (e.g., a centralized or distributed database, and/or associated caches and servers) that store the one or more instructions 2124 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The instructions 2124 may further be transmitted or received over a communications network 2126 using a transmission medium. The instructions 2124 may be transmitted using the network interface device 2120 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system comprising:
   at least one processor; and
   a non-transitory computer-readable medium storing executable instructions that, when executed, cause the at least one processor to perform operations comprising:
   detecting a switchover event or a failover event for a first database host of a first data center, the first database host storing a first table of data;
   in response to detecting the switchover event or the failover event, performing an orchestrated stop of a data extraction process, the orchestrated stop comprising:
   stopping a first extraction of a data stream from the first table of data in the first database host at a specific location within the data stream, the data stream comprising change data of the first table, the change data comprising data in the first table that has changed;

subsequent to stopping the first extraction of the data stream from the first table of data, stopping a first last change record (LCR) mirroring of the change data at the specific location within the data stream, the first LCR mirroring comprising a copying of last change data of the first table from a first LCR cluster of machines in the first data center to a second LCR cluster of machines in a second data center, the second data center having a second database host storing a second table of data;

subsequent to stopping the first LCR mirroring, stopping a first merging of last change data in the first LCR cluster of machines with a record from the first table that corresponds to the data in the first table that has changed, the first merging forming a reconstructed record; and subsequent to stopping the first merging, stopping a first full change record (FCR) mirroring of the reconstructed record at the specific location within the data stream, the first FCR mirroring comprising a copying of the reconstructed record from a first FCR cluster of machines in the first data center to a second FCR cluster of machines in the second data center; and determining an offset value indicating the specific location within the data stream; and performing an orchestrated start of the extraction process in the second data center using the offset value, the orchestrated start comprising:

starting a second extraction of the data stream from the first table of data in the second database host at the specific location within the data stream using the offset value;

subsequent to starting the second extraction of the data stream from the first table of data in the second database host, starting a second LCR mirroring of the change data at the specific location within the data stream, the second LCR mirroring comprising a copying of last change data of the first table from the second LCR cluster of machines in the second data center to another LCR cluster of machines in another data center;

subsequent to starting the second LCR mirroring, starting a second merging of last change data in the second LCR cluster of machines with the reconstructed record stored in a second FCR cluster of machines in the second data center; and subsequent to starting the second merging, starting a second FCR mirroring of the harvested last change data at the specific location within the data stream, the second FCR mirroring comprising a copying of the harvested last change data from the second FCR cluster of machines in the second data center to another FCR cluster of machines in the other data center.

2. The system of claim 1, wherein the other data center is the first data center, the other LCR cluster of machines is the first LCR cluster of machines, and the other FCR cluster of machines is the first FCR cluster of machines.

3. The system of claim 1, wherein the other data center is a third data center, the other LCR cluster of machines is a third LCR cluster of machines, and the other FCR cluster of machines is a third FCR cluster of machines.

4. The system of claim 1, wherein the operations further comprise:

extracting the data stream of change data from the first table of data in the first database host;

transforming a format of the change data into a data serialization format based on a schema identification; and storing the transformed change data in the first LCR cluster of machines.

5. The system of claim 1, wherein the operations further comprise:

performing the first LCR mirroring of the change data from the first LCR cluster of machines in the first data center to the second LCR cluster of machines in the second data center;

performing additional LCR mirroring of the change data from the first LCR cluster of machines in the first data center to one or more additional LCR clusters of machines in one or more additional data centers;

performing the first FCR mirroring of the change data from the first FCR cluster of machines in the first data center to the second FCR cluster of machines in the second data center;

performing additional FCR mirroring of the change data from the first FCR cluster of machines in the first data center to one or more additional FCR clusters of machines in the one or more additional data centers.

6. The system of claim 1, wherein the first merging and the second merging are performed automatically based on a configuration.

7. The system of claim 1, wherein the operations further comprise:

receiving, from an application external to the first data center and the second data center, a request for data; and transmitting the last change data from the second LCR cluster of machines in the second data center to the application.

8. A computer-implemented method comprising:

detecting a switchover event or a failover event for a first database host of a first data center, the first database host storing a first table of data;

in response to detecting the switchover event or the failover event, performing an orchestrated stop of a data extraction process, the orchestrated stop comprising:

stopping a first extraction of a data stream from the first table of data in the first database host at a specific location within the data stream, the data stream comprising change data of the first table, the change data comprising data in the first table that has changed;

subsequent to stopping the first extraction of the data stream from the first table of data, stopping a first last change record (LCR) mirroring of the change data at the specific location within the data stream, the first LCR mirroring comprising a copying of last change data of the first table from a first LCR cluster of machines in the first data center to a second LCR cluster of machines in a second data center, the second data center having a second database host storing a second table of data;

subsequent to stopping the first LCR mirroring, stopping a first merging of last change data in the first LCR cluster of machines with a record from the first table that corresponds to the data in the first table that has changed, the first merging forming a reconstructed record; and subsequent to stopping the first merging, stopping a first full change record (FCR) mirroring of the harvested last change data at the specific location within the data stream, the first FCR mirroring comprising a copying of the harvested last change data from a first FCR cluster of machines in the first data center to a second FCR cluster of machines in the second data center; and determining an offset value indicating the specific location within the data stream; and performing an orchestrated start of the extraction process in the second data center using the offset value, the orchestrated start comprising:

starting a second extraction of the data stream from the first table of data in the second database host at the specific location within the data stream using the offset value;

subsequent to starting the second extraction of the data stream from the first table of data in the second database host, starting a second LCR mirroring of the change data at the specific location within the data stream, the second LCR mirroring comprising a copying of last change data of the first table from the second LCR cluster of machines in the second data center to another LCR cluster of machines in another data center;

subsequent to starting the second LCR mirroring, starting a second merging of last change data in the second LCR cluster of machines with the reconstructed record stored in a second FCR cluster of machines in the second data center; and subsequent to starting the second merging, starting a second FCR mirroring of the harvested last change data at the specific location within the data stream, the second FCR mirroring comprising a copying of the harvested last change data from the second FCR cluster of machines in the second data center to another FCR cluster of machines in the other data center.

9. The computer-implemented method of claim 8, wherein the other data center is the first data center, the other LCR cluster of machines is the first LCR cluster of machines, and the other FCR cluster of machines is the first FCR cluster of machines.

10. The computer-implemented method of claim 8, wherein the other data center is a third data center, the other LCR cluster of machines is a third LCR cluster of machines, and the other FCR cluster of machines is a third FCR cluster of machines.

11. The computer-implemented method of claim 8, further comprising:

extracting the data stream of change data from the first table of data in the first database host;

transforming a format of the change data into a data serialization format based on a schema identification; and storing the transformed change data in the first LCR cluster of machines.

12. The computer-implemented method of claim 8, further comprising:

performing the first LCR mirroring of the change data from the first LCR cluster of machines in the first data center to the second LCR cluster of machines in the second data center;

performing additional LCR mirroring of the change data from the first LCR cluster of machines in the first data center to one or more additional LCR clusters of machines in one or more additional data centers;

performing the first FCR mirroring of the change data from the first FCR cluster of machines in the first data center to the second FCR cluster of machines in the second data center;

performing additional FCR mirroring of the change data from the first FCR cluster of machines in the first data center to one or more additional FCR clusters of machines in the one or more additional data centers.

13. The computer-implemented method of claim 8, wherein the first merging and the second merging are performed automatically based on a configuration.

14. The computer-implemented method of claim 8, further comprising:

receiving, from an application external to the first data center and the second data center, a request for data; and transmitting the last change data from the second LCR cluster of machines in the second data center to the application.

15. A non-transitory machine-readable storage device storing a set of instructions that, when executed by at least one processor, causes the at least one processor to perform performing operations comprising:

detecting a switchover event or a failover event for a first database host of a first data center, the first database host storing a first table of data;

in response to detecting the switchover event or the failover event, performing an orchestrated stop of a data extraction process, the orchestrated stop comprising:

stopping a first extraction of a data stream from the first table of data in the first database host at a specific location within the data stream, the data stream comprising change data of the first table, the change data comprising data in the first table that has changed;

subsequent to stopping the first extraction of the data stream from the first table of data, stopping a first last change record (LCR) mirroring of the change data at the specific location within the data stream, the first LCR mirroring comprising a copying of last change data of the first table from a first LCR cluster of machines in the first data center to a second LCR cluster of machines in a second data center, the second data center having a second database host storing a second table of data;

subsequent to stopping the first LCR mirroring, stopping a first merging of last change data in the first LCR cluster of machines with a record from the first table that corresponds to the data in the first table that has changed, the first merging forming a reconstructed record; and subsequent to stopping the first merging, stopping a first full change record (FCR) mirroring of the harvested last change data at the specific location within the data stream, the first FCR mirroring comprising a copying of the harvested last change data from a first FCR cluster of machines in the first data center to a second FCR cluster of machines in the second data center; and determining an offset value indicating the specific location within the data stream; and performing an orchestrated start of the extraction process in the second data center using the offset value, the orchestrated start comprising:

starting a second extraction of the data stream from the first table of data in the second database host at the specific location within the data stream using the offset value;

subsequent to starting the second extraction of the data stream from the first table of data in the second database host, starting a second LCR mirroring of the change data at the specific location within the data stream, the second LCR mirroring comprising a copying of last change data of the first table from the second LCR cluster of machines in the second data center to another LCR cluster of machines in another data center;

subsequent to starting the second LCR mirroring, starting a second merging of last change data in the second LCR cluster of machines with the reconstructed record stored in a second FCR cluster of machines in the second data center; and subsequent to starting the second merging, starting a second FCR mirroring of the harvested last change data at the specific location within the data stream, the second FCR mirroring comprising a copying of the harvested last change data from the second FCR cluster of machines in the second data center to another FCR cluster of machines in the other data center.

16. The non-transitory machine-readable storage device of claim 15, wherein the other data center is the first data center, the other LCR cluster of machines is the first LCR cluster of machines, and the other FCR cluster of machines is the first FCR cluster of machines.

17. The non-transitory machine-readable storage device of claim 15, wherein the operations further comprise:
   extracting the data stream of change data from the first table of data in the first database host;
   transforming a format of the change data into a data serialization format based on a schema identification; and
   storing the transformed change data in the first LCR cluster of machines.

18. The non-transitory machine-readable storage device of claim 15, wherein the operations further comprise:
   performing the first LCR mirroring of the change data from the first LCR cluster of machines in the first data center to the second LCR cluster of machines in the second data center;
   performing additional LCR mirroring of the change data from the first LCR cluster of machines in the first data center to one or more additional LCR clusters of machines in one or more additional data centers;
   performing the first FCR mirroring of the change data from the first FCR cluster of machines in the first data center to the second FCR cluster of machines in the second data center;
   performing additional FCR mirroring of the change data from the first FCR cluster of machines in the first data center to one or more additional FCR clusters of machines in the one or more additional data centers.

19. The non-transitory machine-readable storage device of claim 15, wherein the first merging and the second merging are performed automatically based on a configuration.

20. The non-transitory machine-readable storage device of claim 15, wherein the operations further comprise:
   receiving, from an application external to the first data center and the second data center, a request for data; and
   transmitting the last change data from the second LCR cluster of machines in the second data center to the application.

* * * * *